US012125447B2

(12) United States Patent
Orio et al.

(10) Patent No.: US 12,125,447 B2
(45) Date of Patent: Oct. 22, 2024

(54) BACKLIGHT CONTROL FOR PROVIDING COMPENSATED LUMINANCE TO DISPLAY DEVICES

(71) Applicant: Synaptics Incorporated, San Jose, CA (US)

(72) Inventors: Masao Orio, Tokyo (JP); Takashi Nose, Kanagawa (JP); Hirobumi Furihata, Tokyo (JP); Tomoo Minaki, Tokyo (JP); Kazutoshi Aogaki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 5 days.

(21) Appl. No.: 18/069,074

(22) Filed: Dec. 20, 2022

(65) Prior Publication Data

US 2024/0203368 A1 Jun. 20, 2024

(51) Int. Cl.
*G09G 3/34* (2006.01)

(52) U.S. Cl.
CPC ......... *G09G 3/342* (2013.01); *G09G 2320/06* (2013.01); *G09G 2360/16* (2013.01)

(58) Field of Classification Search
CPC ............ G09G 3/34; G09G 3/32; G09G 3/342; G09G 3/36; G09G 2320/06; G09G 2360/16; G09G 5/10
See application file for complete search history.

(56) References Cited

U.S. PATENT DOCUMENTS

| | | | | |
|---|---|---|---|---|
| 2010/0020005 | A1 | 1/2010 | Jung et al. | |
| 2010/0053066 | A1* | 3/2010 | Nonaka ................ | G09G 3/3648 345/102 |
| 2011/0148941 | A1 | 6/2011 | Kim et al. | |
| 2012/0281028 | A1 | 11/2012 | Orlick et al. | |
| 2019/0103062 | A1 | 4/2019 | Li | |
| 2019/0348001 | A1 | 11/2019 | Shi et al. | |

FOREIGN PATENT DOCUMENTS

KR 1020110070235 A 6/2011

OTHER PUBLICATIONS

International Search Report dated Feb. 16, 2024 in International Application No. PCT/US2023/076174 filed Oct. 6, 2023.

* cited by examiner

*Primary Examiner* — Rodney Amadiz
(74) *Attorney, Agent, or Firm* — Leydig, Voit & Mayer, Ltd.

(57) ABSTRACT

A display driver includes a display panel, a backlight array, and backlight control circuitry. The backlight array includes a plurality of light sources and is configured to illuminate the display panel. The backlight control circuitry is configured to determine first base luminance for a first light source of the plurality of light sources based at least in part on pixel data for a first set of pixels associated with the first light source. The backlight control circuitry is further configured to determine first compensated luminance for the first light source by modifying the first base luminance based at least in part on a position of the first light source in the backlight array. The backlight control circuitry is further configured to control light emission of the first light source based at least in part on the first compensated luminance.

19 Claims, 25 Drawing Sheets

BACKLIGHT CONTROL FOR PROVIDING COMPENSATED LUMINANCE TO DISPLAY DEVICES

FIELD

The disclosed technology generally relates to backlight control for display devices.

BACKGROUND

Display devices with light-transmissive display panels, such as light-transmissive liquid crystal display (LCD) panels, incorporate backlights that illuminate the light-transmissive display panels. Modern backlighting systems (e.g., direct-lit backlighting, full array backlighting etc.) may illuminate a display panel with an array of light sources (such as light emitting diodes (LEDs)) disposed behind the display panel. The light sources may be configured to illuminate corresponding regions or areas of the display panel. The use of an array of light sources for backlighting facilitates local dimming, which may provide brighter or darker portions on the display image to enhance the image quality.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In general, in one aspect, a display device includes a display panel, a backlight array, and backlight control circuitry. The backlight array includes a plurality of light sources and is configured to illuminate the display panel. The backlight control circuitry is configured to determine first base luminance for a first light source of the plurality of light sources based at least in part on pixel data for a first set of pixels associated with the first light source. The backlight control circuitry is further configured to determine first compensated luminance for the first light source by modifying the first base luminance based at least in part on a position of the first light source in the backlight array. The backlight control circuitry is further configured to control light emission of the first light source based at least in part on the first compensated luminance.

In general, in one aspect, a display device includes a display panel, a backlight array, and backlight control circuitry. The backlight array includes a plurality of light sources and is configured to illuminate the display panel. The backlight control circuitry is configured to determine first luminance for a first light source of the plurality of light sources based at least in part on first pixel data for a first set of pixels of the display panel. The backlight control circuitry is further configured to determine second luminance for a hypothetically-defined light source based at least in part on second pixel data for a second set of pixels of the display panel. The backlight control circuitry is further configured to determine compensated luminance for the first light source based at least in part on the first luminance and the second luminance, and the backlight control circuitry is further configured to control the first light source to emit light based at least in part on the compensated luminance.

In general, in one aspect, a method includes illuminating a display panel by a backlight array that includes a plurality of light sources. The method further includes determining first base luminance for a first light source of the plurality of light sources based at least in part on first pixel data for a first set of pixels of the display panel. The first set of pixels is associated with the first light source. The method further includes determining first compensated luminance for the first light source by modifying the first base luminance based at least in part on a position of the first light source in the backlight array. The method further includes controlling light emission of the first light source based at least in part on the first compensated luminance.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are shown in the appended drawings. It is to be noted, however, that the appended drawings show only exemplary embodiments, and are therefore not to be considered limiting of inventive scope, as the disclosure may admit to other equally effective embodiments.

Figure 1:
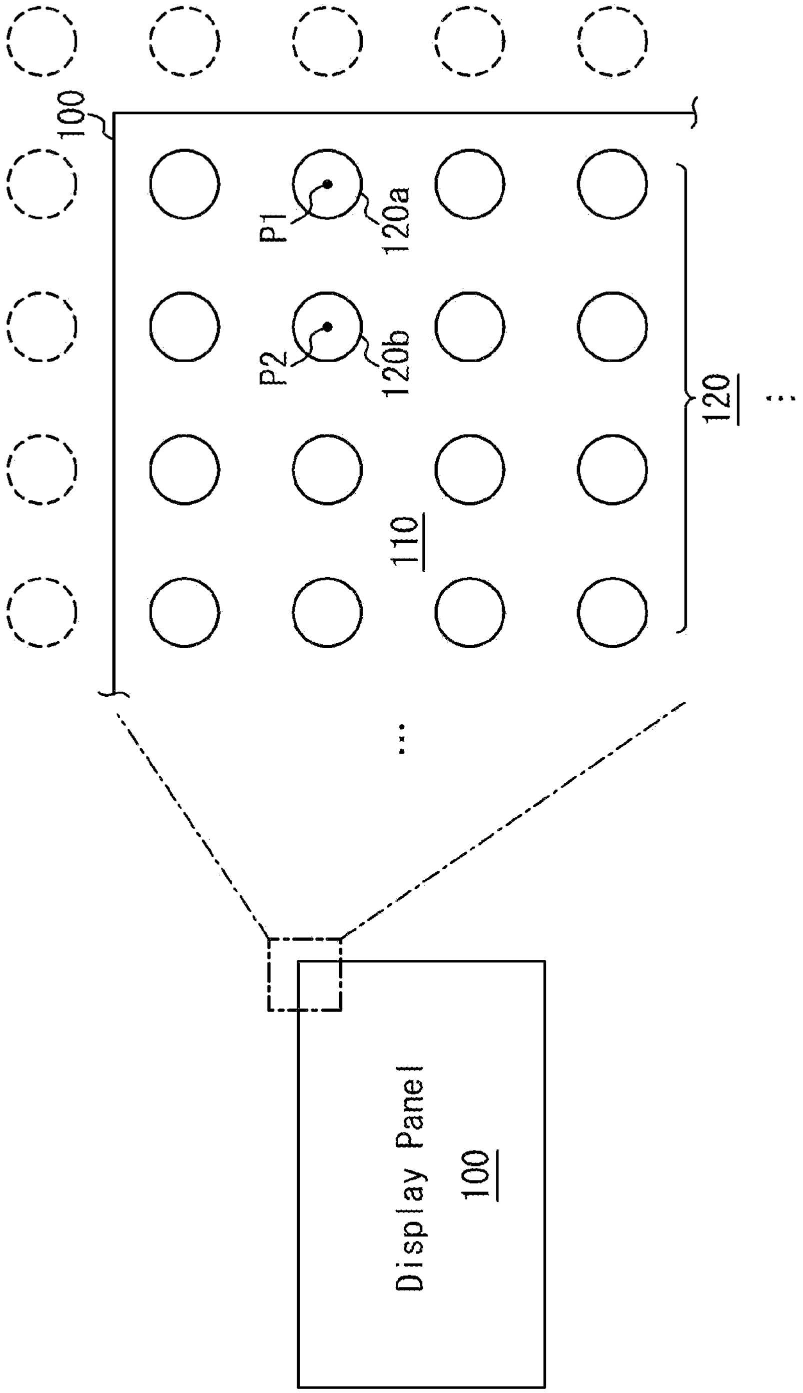
FIG. 1 shows an example configuration of a display device, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure provides devices and methods for backlight control for display devices that use a backlight array that includes multiple light sources (e.g., LEDs) to illuminate a display panel (e.g., an LCD panel or other light-transmissive display panels). In various implementations, a backlight array that includes multiple light sources may be located behind a display panel, and the light sources may be configured to respectively illuminate corresponding regions or areas of the display panel.

The luminance of each light source may be individually controlled to achieve local dimming, which provides brighter portions and darker portions of the display image to enhance the image contrast. The luminance of each light source may be determined based at least in part on pixel data of a set of neighboring pixels positioned around the light source. The pixel data for a pixel may include the greylevels of respective colors (e.g., red, green, and blue) for the pixel. In one implementation, the luminance of each light source may be determined based on an average picture level (APL) of the neighboring pixels calculated based on the pixel data for the neighboring pixels. The luminance of each light source may increase with an increase in the APL of the neighboring pixels.

Since the light emitted from the light sources of the backlight expands as the light travels towards the display panel, each pixel of the display panel may receive light not only from the nearest light source but also other light sources positioned around the nearest light source. In one example, each pixel may receive light from the nearest light source and its adjacent light sources (e.g., eight adjacent light sources for a rectangular backlight array.) Accordingly, the number of light sources that illuminate each pixel may vary depending on the location with respect to the backlight array. For example, pixels located near the edges of the backlight array (e.g., outermost pixels of the backlight array) may receive light from fewer numbers of light sources than pixels in the inner portion of the backlight array. Pixels located near the corners of the backlight array may receive light from further fewer numbers of light sources. Such variation in the number of light sources that illuminate each pixel may result in a decrease in the brightness of the peripheral portion of the display image, causing brightness unevenness.

FIG. 1 shows an example configuration of a display device that includes a display panel 100 and a backlight array 110, according to one or more embodiments. In the shown embodiment, the backlight array 110 includes light sources 120 arrayed in rows and columns. In FIG. 1, the broken line circles outside of the display panel 100 indicate absence of light sources. Each light source 120 may include an LED or a different type of light emitting element. While FIG. 1 shows 16 light sources 120, persons skilled in the art would appreciate that the backlight array 110 may include more or less than 16 light sources 120. In actual implementations, the backlight array 110 may include one thousand to several thousand light sources disposed behind the display panel 100. While the light sources 120 are shown as being circular, the light sources 120 may be in a different shape (e.g., square, rectangular, oval, etc.)

As discussed above, the numbers of light sources that illuminate each pixel in the display panel 100 may depend on the location of the pixel with respect to the backlight array 110. In FIG. 1, the pixel P1 is positioned in front of the light source 120*a* that is an outermost light source of the backlight array 110 positioned at a side edge of the backlight array 110 while the pixel P2 is positioned in front of the light source 120*b* that is a second-outermost light source of the backlight array 110. In embodiments where a pixel receives light from the nearest light source and its adjacent light sources, for example, the number of light sources 120 that illuminate the pixel P1 is six since the number of light sources 120 that surround the light source 120*a* is five. Meanwhile, the number of light sources 120 that illuminate the pixel P2 is nine, since the number of light sources 120 that surround the light source 120*b* is eight. Accordingly, the pixel P1 receives light from fewer light sources 120 than the pixel P2, which may cause a decrease in the brightness of the peripheral portion of the display image (e.g., the portion at the edge of the display image).

One approach to address this issue may be to compensate the decrease in the brightness of the peripheral portion of the display image by increasing the luminance of the outermost light sources 120 (including the light source 120*a*) of the backlight array 110. This approach may however cause an undesired luminance increase in the region just inside of the outermost light sources 120, resulting in brightness unevenness of the display image. For example, the intensity of the light received by the pixel P2 may be undesirably increased due to the increase in the luminance of the outermost light sources 120.

The present disclosure recognizes that adjusting luminance of at least some of second-outermost and other inner light sources 120 in addition to the outermost light sources 120 when compensating the decrease of brightness at the edge of the display image. In the embodiment shown in FIG. 1, for example, the luminance of the second-outermost light sources 120 may be decreased to compensate the undesired luminance increase potentially caused by the increase in the luminance of the outermost light sources 120.

The present disclosure provides various techniques to mitigate the decrease at the edge of the display image potentially caused by the variations in the number of light sources that illuminate each pixel. In one or more embodiments, base luminance is determined for each light source based on pixel data for pixels positioned near each light source to achieve local dimming. To address the decrease of brightness at the edge of the display image, compensated luminance is determined for each light source by modifying the base luminance based on the position of each light source in the backlight array. The light emission of each light source is controlled based at least in part on the compensated luminance.

The compensated luminance of a light source of interest may be determined by applying a backlight compensation coefficient to the base luminance of the light source of the interest. The backlight compensation coefficient for the light source of the interest may be determined based on the arrangement of other light sources of the plurality of light sources around the light source of interest and, if the light source of the interest is not an outermost light source, further based on the distance from the nearest outermost light source (e.g., whether the light source of interest is second-outermost or third-outermost, etc.). For the embodiment shown in FIG. 1, for example, the backlight compensation coefficient for the outermost light source 120*a*, which is surrounded by five light sources 120, is determined such that the compensated luminance of the outermost light source 120*a* is higher than the base luminance of the outermost light source 120*a*. Meanwhile, the backlight compensation coefficient for the second-outermost light source 120*b*, which is surrounded by eight light sources 120, is determined such that the compensated luminance of the second-outermost light source 120*b* is lower than the base luminance of the second-outermost light source 120*b*.

Figure 2A:
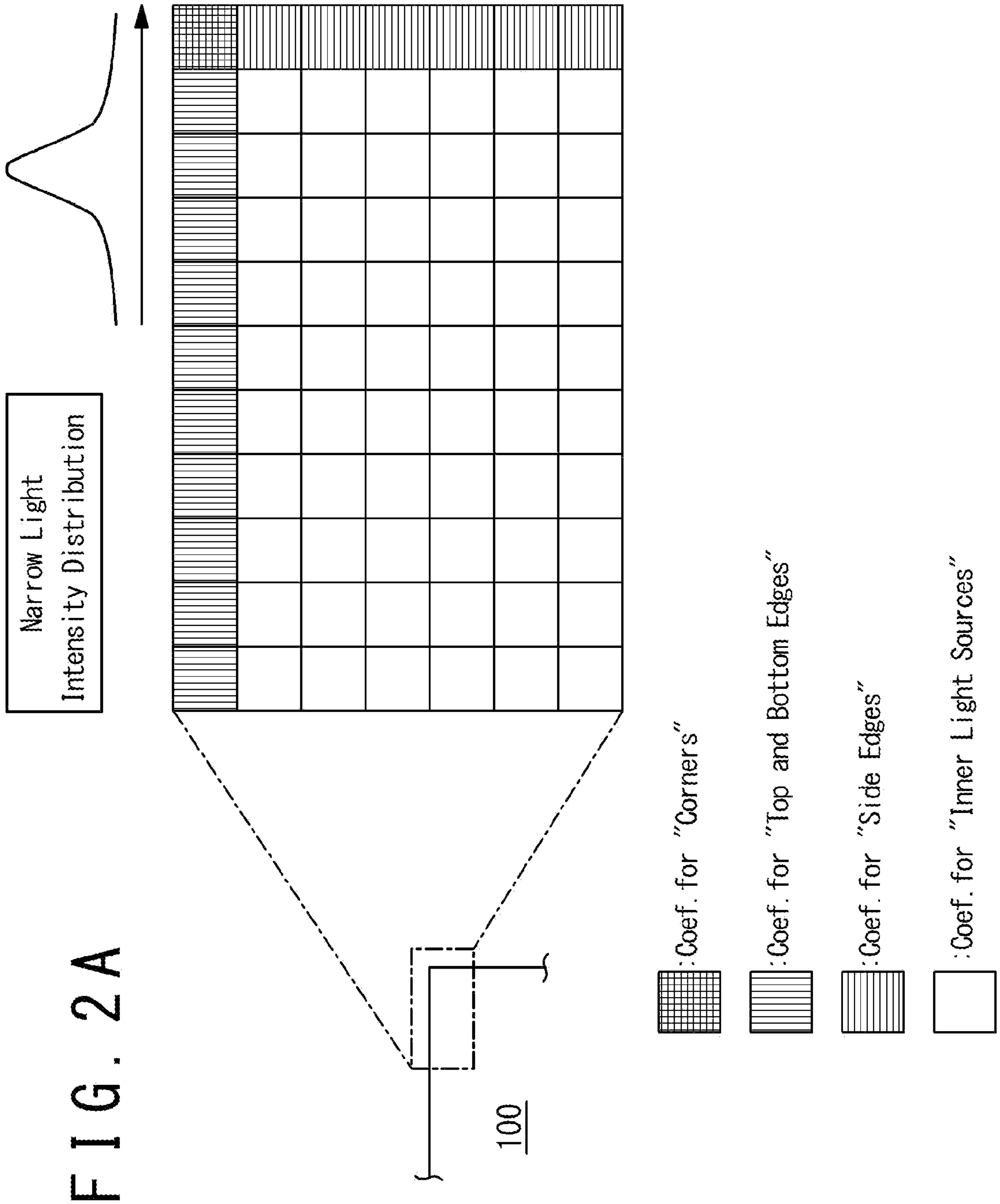
FIGS. 2A, 2B, and 2C show example backlight compensation coefficients prepared for respective light sources, according to one or more embodiments.
Figure 2B:
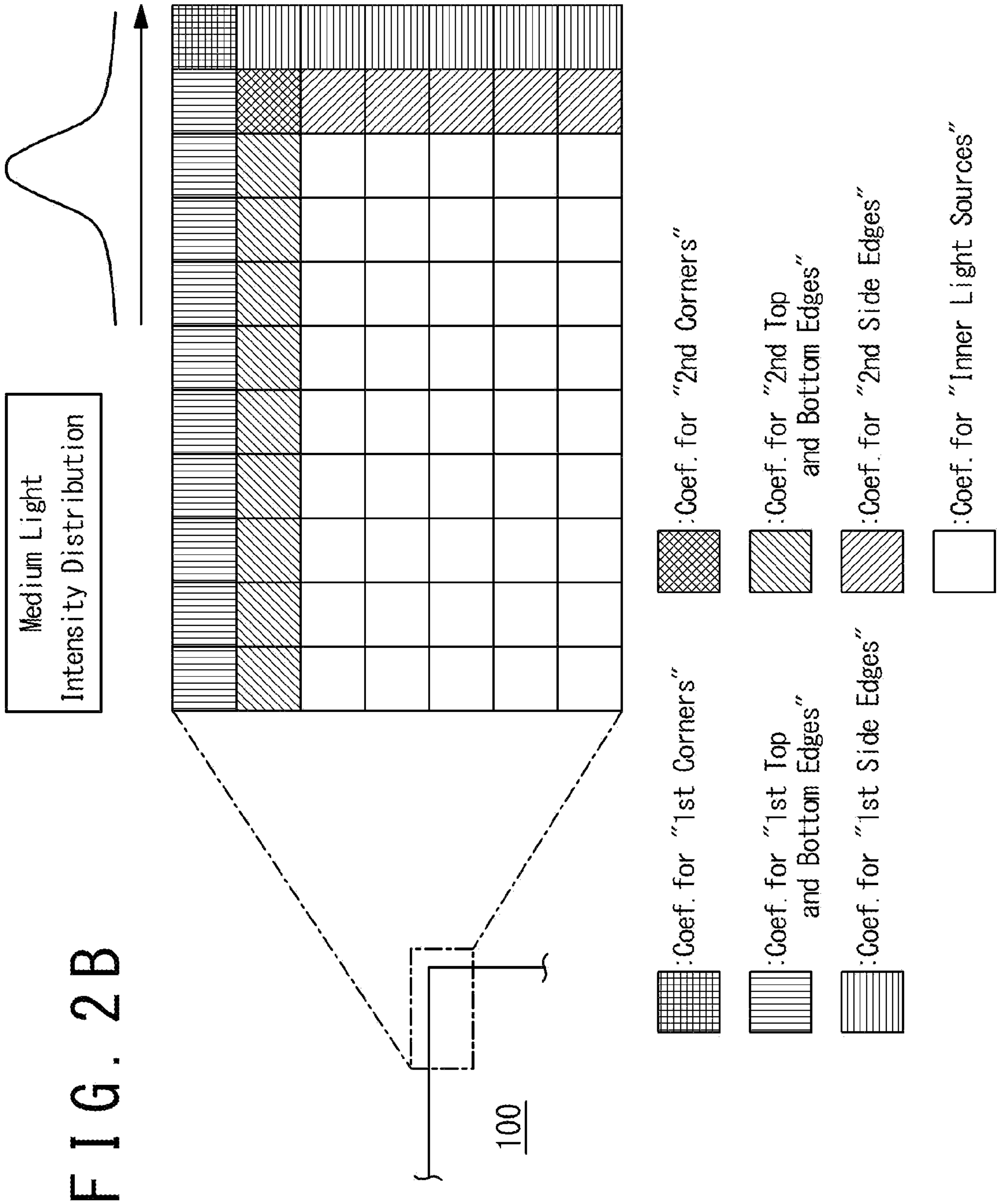
Figure 2C:
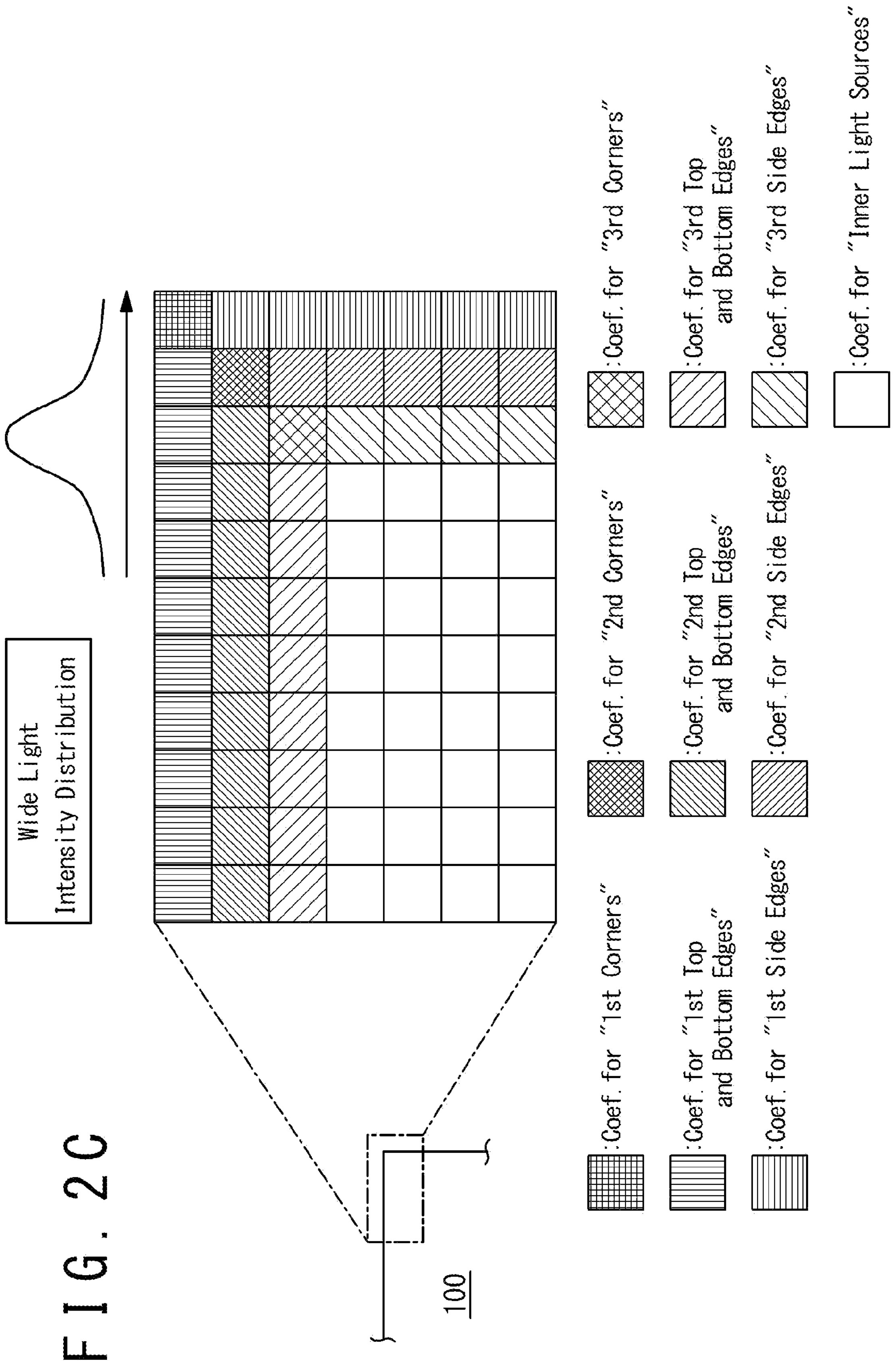

FIGS. 2A, 2B, and 2C schematically show example backlight compensation coefficients prepared for respective light sources, according to one or more embodiments. The hatched and blank boxes in FIGS. 2A-2C respectively correspond to light sources of the backlight array.

Referring to FIG. 2A, in one or more embodiments, multiple "light source categories" are defined for the backlight array, and the backlight compensation coefficient for a light source of interest is determined based on which of the categories the light source of interest belongs to. Each "light source category" may be defined based on the arrangement of other light sources around the light source of interest and/or the distance of the light source of interest from the nearest outermost light source (e.g., whether the light source of interest is second-outermost or third-outermost, etc.). In the embodiment shown in FIG. 2A, for example, four light source categories "Corners", "Top and Bottom Edges", "Side Edges", and "Inner Light Sources" are defined. The light source category "Corners" refers to a group of light sources positioned at the corners of the backlight array. The light source category "Top and Bottom Edges" refers to a group of light sources positioned at the top and bottom edges of the backlight array. The light source category "Side Edges" refers to a group of light sources positioned at the side edges of the backlight array. The light source category "Inner Light Sources" refers to other light sources, which are positioned at inner positions in the backlight array. For example, a backlight compensation coefficient defined for the light source category "Corners" may be used for luminance compensation for the light sources at the corners of the backlight array, and a backlight compensation coefficient defined for the light source category "Top and Bottom Edges" may be used for luminance compensation for the light sources at the top and bottom edges of the backlight array. Further, a backlight compensation coefficient defined for the light source category "Side Edges" may be used for luminance compensation for the light sources at the side edges of the backlight array, and a backlight compensation coefficient defined for the light source category "Inner Light Sources" may be used for luminance compensation for the remaining light sources that are not located at the corners or edges of the backlight array.

To achieve more accurate compensation, the compensation coefficients may further depend on the width of the light intensity distribution of the light sources. The above-mentioned FIG. 2A shows compensation coefficients prepared for respective light sources in the case where the light intensity distribution of the light sources is a first light intensity distribution labelled as "narrow." Meanwhile, FIG. 2B shows compensation coefficients in the case where the light intensity distribution of the light sources is a second light intensity distribution labelled as "medium", and FIG. 2C shows compensation coefficients in the case where the light intensity distribution of the light sources is a third light intensity distribution labelled as "wide." The first light intensity distribution ("narrow") is narrower than the second light intensity distribution ("medium"), and third light intensity distribution ("wide") is wider than the second light intensity distribution. In one embodiment, the light source categories may be defined depending on the width of the light intensity distribution of the light sources. While FIGS. 2A-2C shows the light intensity distribution of the light sources is symmetrical, in other embodiments, the light intensity distribution of the light sources may be asymmetrical.

In embodiments where the light intensity distribution of the light sources is "medium" as shown in FIG. 2B, light source categories may be defined differently from the embodiment of FIG. 2A. More specifically, seven light source categories are defined in the embodiment of FIG. 2B. The outermost light sources of the backlight array are classified into one of categories "1st Corners", "1st Top and Bottom Edges" and "1st Side Edges." The category "1st Corners" refers to a group of outermost light sources positioned at the corners, the category "1st Top and Bottom Edges" refers to a group of outermost light sources positioned at the top and bottom edges, and the category "1st Side Edges" refers to a group of outermost light sources positioned at the side edges. The second-outermost light sources are classified into one of categories "2nd Corners", "2nd Top and Bottom Edges" and "2nd Side Edges." The category "2nd Corners" refers to a group of second-outermost light sources positioned at the corners of the array of the second-outermost light sources, the category "2nd Top and Bottom Edges" refers to a group of second-outermost light sources positioned at the top and bottom edges of the array of the second-outermost light sources, and the category "2nd Side Edges" refers to a group of second-outermost light sources positioned at the side edges of the array of the second-outermost light sources. The remaining light sources are classified into category "Inner Light Sources." The backlight compensation coefficients for the respective light sources are determined based on which of these categories the respective light sources are classified into.

In embodiments where the light intensity distribution of the light sources is "wide" as shown in FIG. 2C, light source categories may be defined differently from the embodiments of FIGS. 2A and 2B. More specifically, ten light source categories are defined in the embodiment of FIG. 2C. The outermost light sources of the backlight array are classified into one of categories "1st Corners", "1st Top and Bottom Edges" and "1st Side Edges." The second-outermost light sources are classified into one of categories "2nd Corners", "2nd Top and Bottom Edges" and "2nd Side Edges." The third outermost light sources are classified into one of categories "3rd Corners", "3rd Top and Bottom Edges" and "3rd Side Edges." The remaining light sources are classified into category "Inner Light Sources." The category "3nd Corners" refers to a group of third-outermost light sources positioned at the corners of the array of the third-outermost light sources, the category "3rd Top and Bottom Edges" refers to a group of third-outermost light sources positioned at the top and bottom edges of the array of the third-outermost light sources, and the category "3rd Side Edges" refers to a group of third-outermost light sources positioned at the side edges of the array of the third-outermost light sources. The backlight compensation coefficients for the respective light sources are determined based on which of these categories the respective light sources are classified into.

Figure 3A:
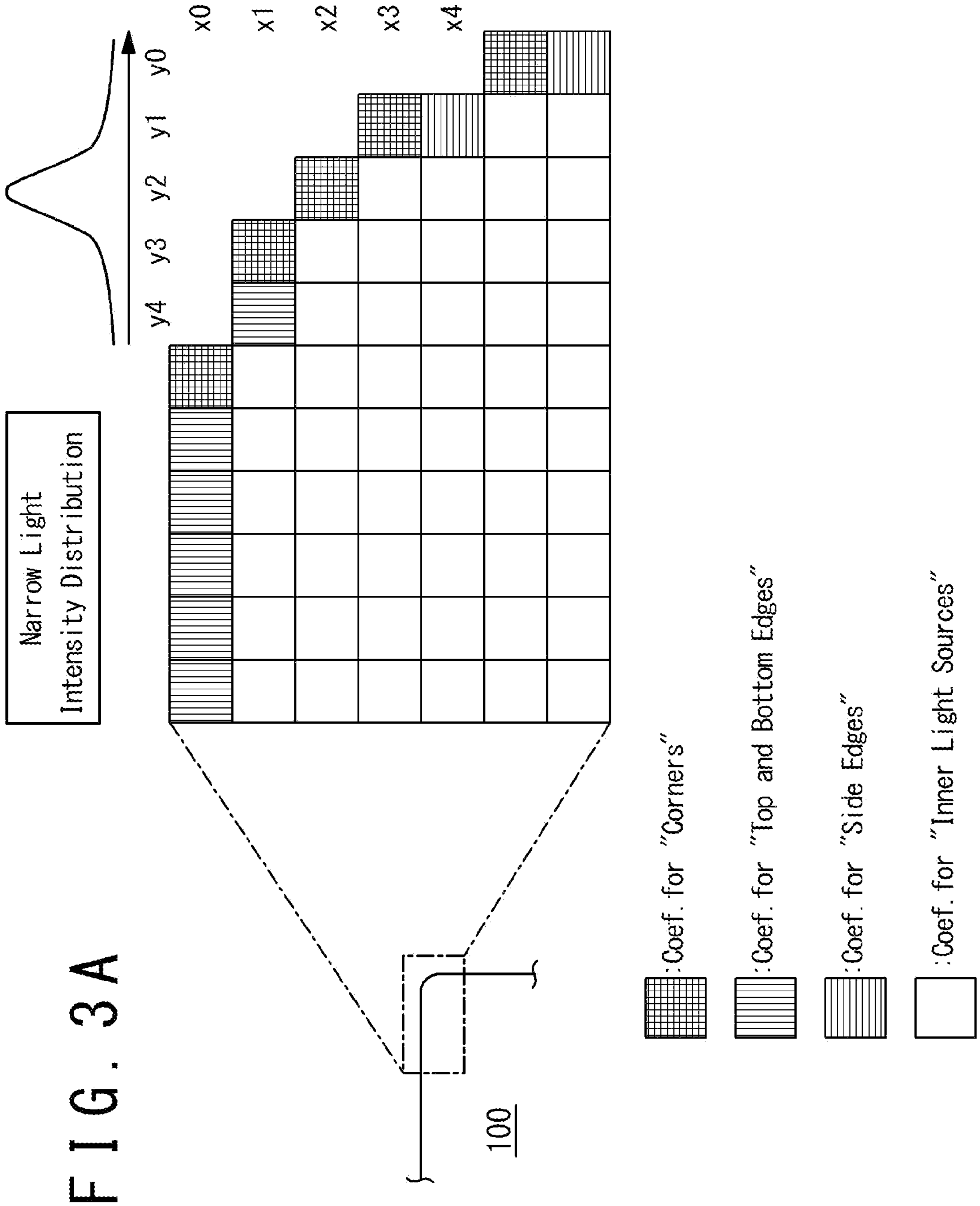
FIGS. 3A, 3B, and 3C show example backlight compensation coefficients prepared for respective light sources, according to other embodiments.
Figure 3B:
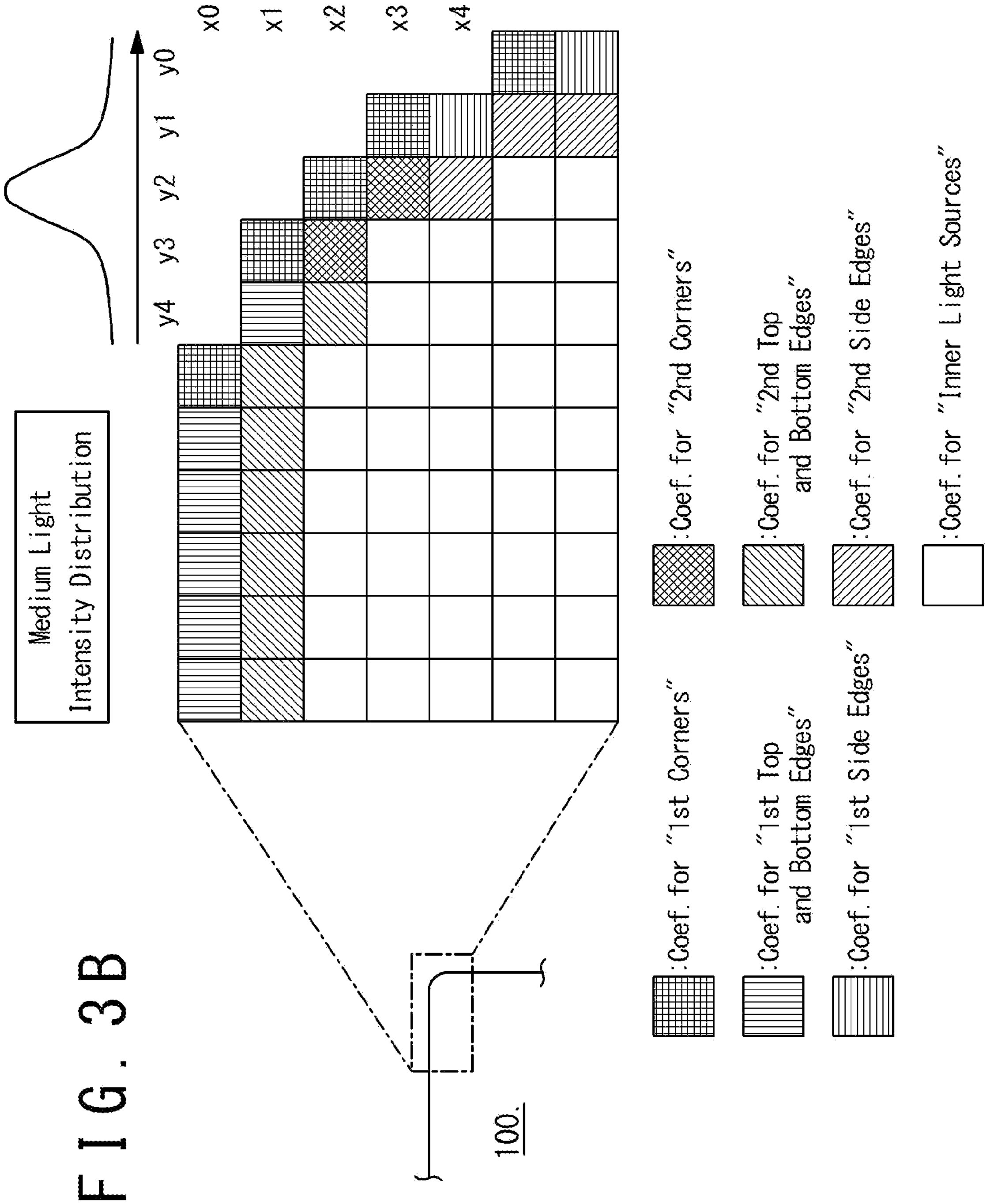
Figure 3C:
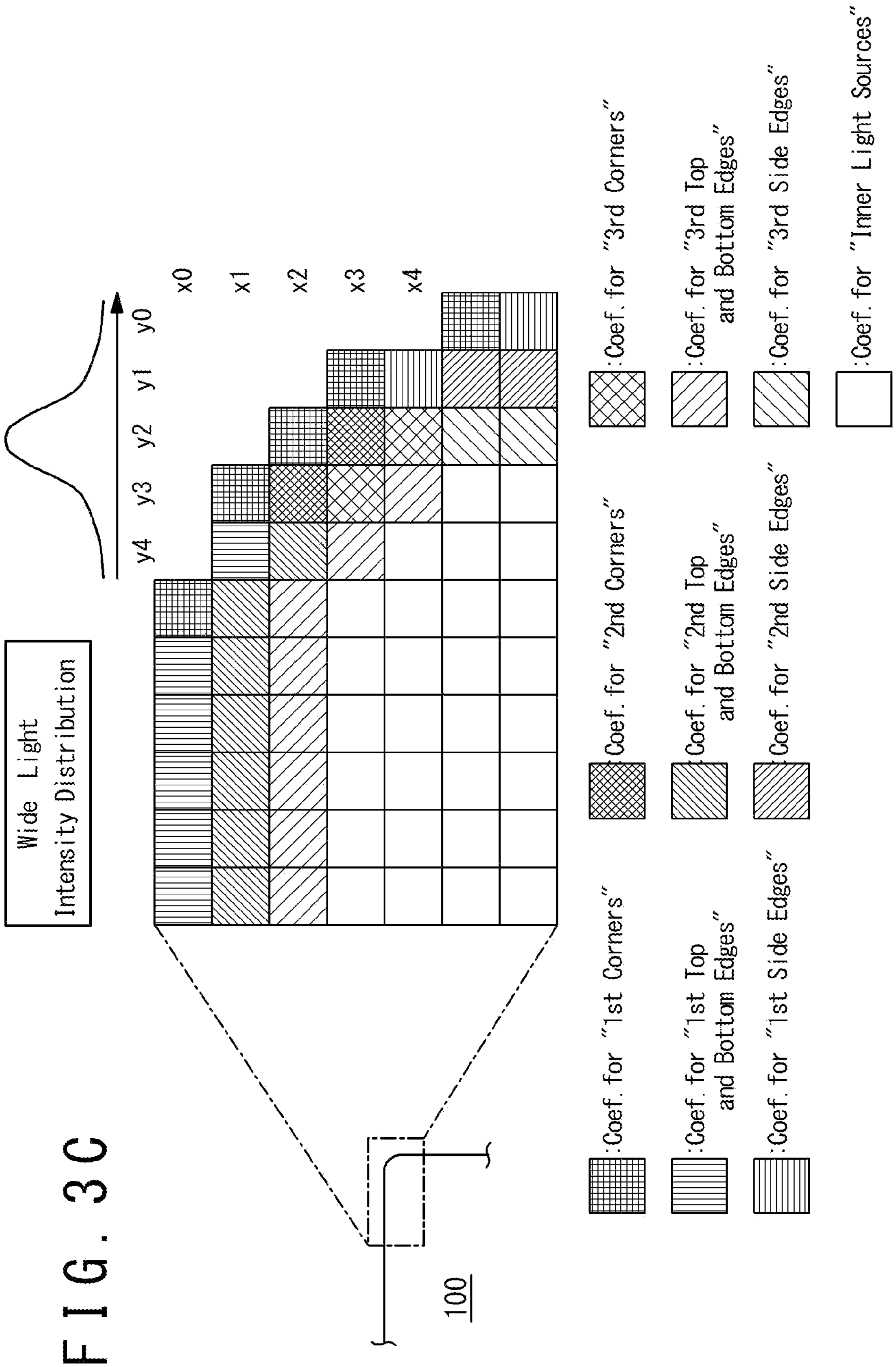

As shown in FIGS. 3A, 3B, and 3C, some embodiments may be based on a backlight array which is not rectangular. A non-rectangular backlight array may be advantageously used to illuminate a non-rectangular display panel. Shown in FIGS. 3A, 3B, and 3C are backlight arrays with beveled corners, which may be suitably used for corner-rounded display panels. In FIGS. 3A to 3C, "x0", "x1", "x2", "x3", "x4", "y0", "y1", "y2", "y3", and "y4" are set of parameters that indicate the arrangement of the light sources at the right top corner of the backlight array. The parameter x0 indicates the position of the rightmost light source in the top row of the light sources, the parameter x1 indicates the position of the rightmost light source in the second top row, the parameter x2 indicates the position of the rightmost light source in the third top row, the parameter x3 indicates the position of the rightmost light source in the fourth top row, and the parameter x4 indicates the position of the rightmost light source in the fifth top row. The parameter y0 indicates the position of the topmost light source in the rightmost column of the light sources, the parameter y1 indicates the position of the topmost light source in the second rightmost column, the parameter y2 indicates the position of the topmost light source in the third rightmost column, the parameter y3 indicates the position of the topmost light source in the fourth rightmost column, and the parameter y4 indicates the position of the topmost light source in the fifth rightmost column. In embodiments where the arrangement of the light sources is horizontally and vertically symmetric, the parameters x0-x4 and y0-y4 may also indicate the other three corners of the backlight array. In other embodiments, the arrangement of the light sources at the corners of the backlight array may be indicated by other parameters in addition to or in place of "x0", "x1", "x2", "x3", "x4", "y0", "y1", "y2", "y3", and "y4".

Also in the embodiments shown in FIG. 3A to 3B, the light sources are classified into light source categories defined based on the width of the light intensity distribution of the light sources. FIG. 3A shows four light source categories defined for the case where light intensity distribution of the light sources is the first light intensity distribution "narrow." Further, FIG. 3B shows seven light source categories defined for the case where light intensity distribution of the light sources is the second light intensity distribution "medium", and FIG. 3C shows ten light source categories defined for the case where light intensity distribution of the light sources is the third light intensity distribution "wide." In the embodiments shown in FIGS. 3A to 3C, the classification of the light sources may be performed referring to the arrangement of the light sources at the corner of the backlight array, which may be indicated by the parameters x0-x4, y0-y4 and/or other parameters that indicate the arrangement of the light sources at the corner of the backlight array.

In the following, a description is given of various specific embodiments for luminance compensation to mitigate the decrease of brightness at the edge of the display image potentially caused by the variations in the number of light sources that illuminate each pixel.

Figure 4:
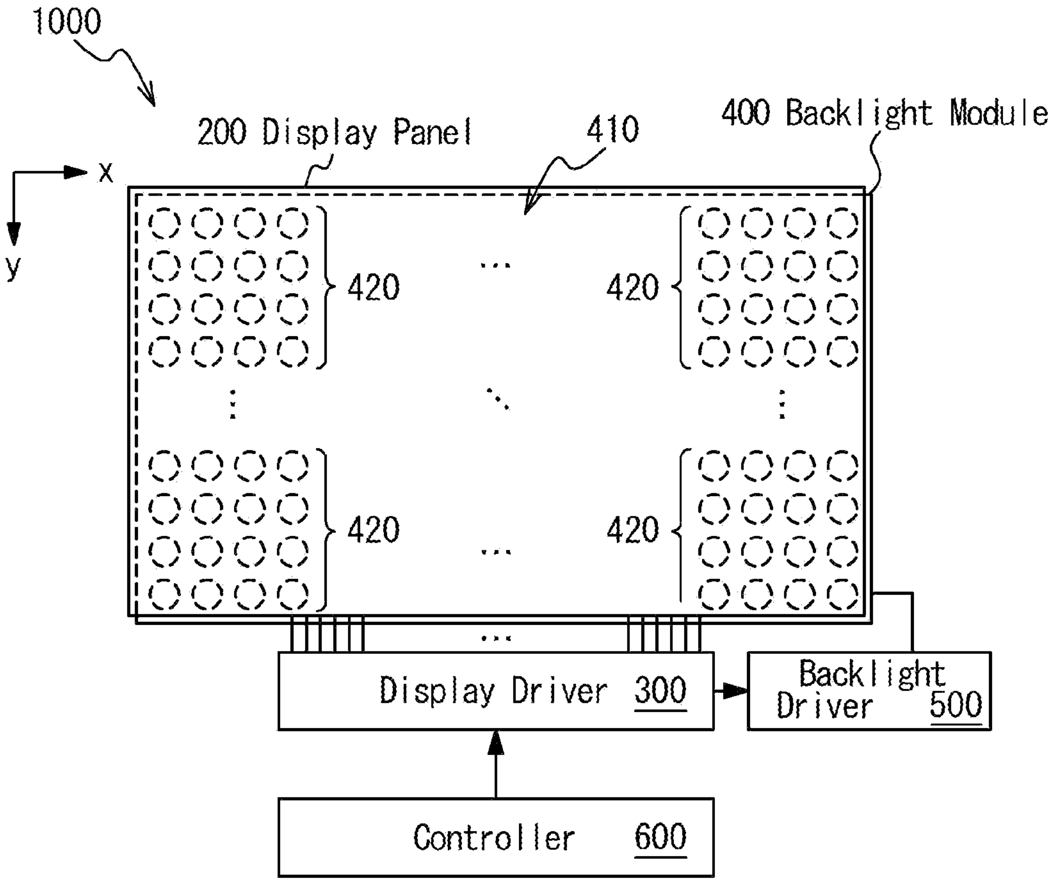
FIG. 4 shows an example configuration of a display device, according to one or more embodiments.

FIG. 4 shows an example configuration of a display device 1000, according to one or more embodiments. In the shown embodiment, the display device 1000 includes a display panel 200 and is configured to display desired images on the display panel 200. While FIG. 4 shows that the display panel 200 has a rectangular shape with corners of the right angle, the display panel 200 may have a different shape (e.g., a rectangular shape with rounded corners). The display panel 200 may be a light-transmissive display panel, such as an LCD panel. In FIG. 4, the x axis is defined in the horizontal direction of the display panel 200, and the y axis is defined in the vertical direction of the display panel 200.

The display device 1000 further includes a display driver 300, a backlight module 400, and a backlight driver 500. The display driver 300 is configured to drive the display panel 200 to display a desired image on the display panel 200 under control of a controller 600. The controller 600 may be a processor such as an application processor, a host, a central processing unit (CPU), a microprocessor unit (MPU) or a different type of processor. The backlight module 400 is configured to illuminate the display panel 200. The backlight module 400 includes a backlight array 410 in which a plurality of light sources 420 are arrayed. It is noted that the light sources 420, which is positioned behind the display panel 200, are shown in phantom in FIG. 4. While FIG. 4 shows 64 light sources 420, a skilled person would appreciate that the backlight module 400 may include more or less than 64 light sources 420. In actual implementations, the backlight array 110 may include several hundreds to several thousand light sources 420. In one implementation, each light source 420 may include an LED or a different type of light source. In the shown embodiment, the light sources 420 are arranged in an array or matrix. In other embodiments, the light sources 420 may be arranged in an irregular or regular pattern. The backlight module 400 is coupled to the backlight driver 500. The backlight driver 500 is configured to drive the light sources 420 of the backlight array 410 under the control of the display driver 300 so that each light source 420 emits light with luminance specified by the display driver 300.

Figure 5:
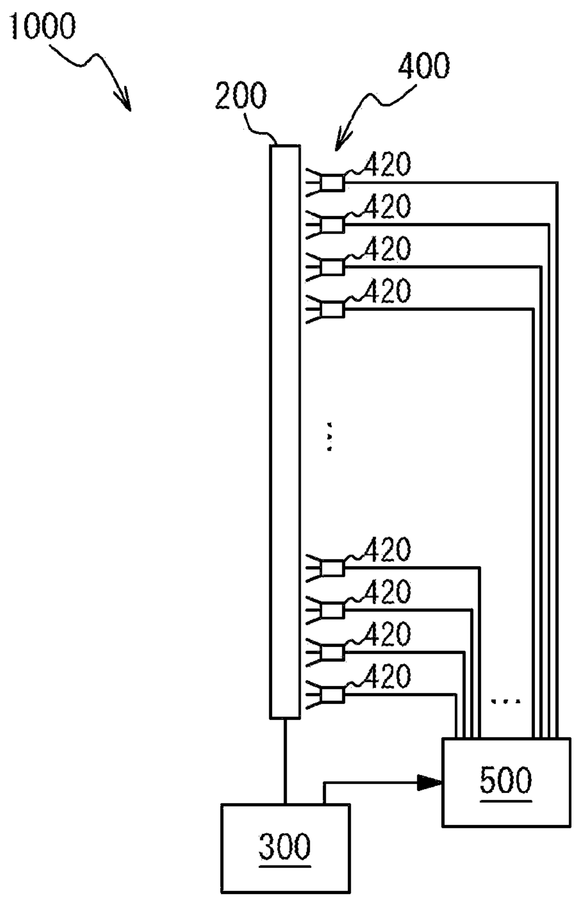
FIG. 5 is a side view showing the example configuration of the display device, according to one or more embodiments.

As shown in FIG. 5, the light sources 420 are located behind the display panel 200 and configured to illuminate corresponding portions of the display panel 200. It is noted that the portion of the display panel 200 illuminated by one light source 420 may partially overlap the portion of the display panel 200 illuminated by a different light source 420. Accordingly, each pixel of the display panel 200 may receive light from two or more light sources 420. While FIG. 5 shows eight light sources 420, a skilled person would appreciate that the backlight module 400 may include more than eight light sources 420.

Figure 6:
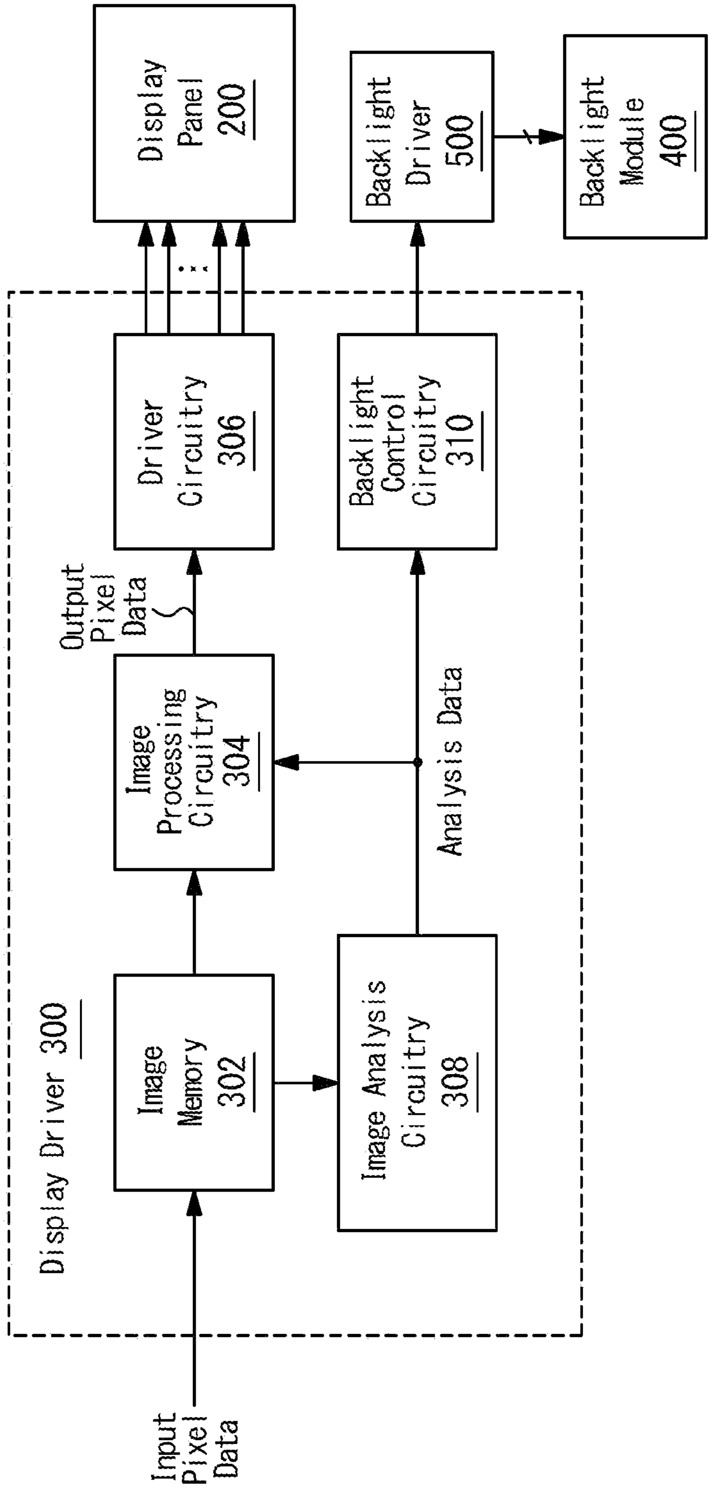
FIG. 6 shows an example configuration of a display driver, according to one or more embodiments.

FIG. 6 shows an example configuration of the display driver 300, according to one or more embodiments. In the shown embodiment, the display driver 300 includes an image memory 302, image processing circuitry 304, driver circuitry 306, image analysis circuitry 308, and backlight control circuitry 310.

The image memory 302 is configured to receive input pixel data corresponding to a display image to be displayed on the display panel 200 from the controller 600 (shown in FIG. 5) and store therein the received input pixel data. In one implementation, the input pixel data includes greylevels of respective primitive colors (e.g., red (R), green (G), and blue (B)) for respective pixels of the display panel 200. In one implementation, pixel data for each pixel may include greylevels of respective primitive colors (e.g., red (R), green (G), and blue (B)). In one implementation, each pixel of the display panel 200 may include R, G, and B subpixels configured to display red, green, and blue colors, respectively, and pixel data for each pixel may include R, G, and B greylevels that specify luminance of the R, G, and B subpixels, respectively. In an alternative embodiment, the image memory 302 may be omitted and the input pixel data may be directly provided to the image processing circuitry 304 and the image analysis circuitry 308.

The image processing circuitry 304 is configured to apply image processing to the input pixel data retrieved from the image memory 302 to generate output pixel data. The image processing performed by the image processing circuitry 304 may include color adjustment, demura correction, deburn correction, image scaling, gamma transformation, or other image processes.

The driver circuitry 306 is configured to receive the output pixel data from the image processing circuitry 304 and drive respective pixels disposed in the display panel 200 based at least in part on the output pixel data. In one implementation, each pixel in the display panel 200 may include R, G, and B subpixels and the output pixel data may specify the luminance levels of the R, G, and B subpixels of each pixel. The driver circuitry 306 may be configured to program or update the R, G, and B subpixels of each pixel based at least in part on the output pixel data to control the luminance levels of the R, G, and B subpixels as specified by the output pixel data.

The image analysis circuitry 308 and the backlight control circuitry 310 are collectively configured to generate and provide backlight control instructions to the backlight driver 500 based at least in part on the input pixel data to control the luminance of the respective light sources 420 (shown in FIGS. 4 and 5) of the backlight array 410. In one embodiment, the input pixel data is provided from the image memory 302 to the image analysis circuitry 308. In an alternative embodiment, the input pixel data may be processed by the image processing circuitry 304 and the processed input pixel data may be provided to the image analysis circuitry 308. The image analysis circuitry 308 is configured to analyze the input pixel data (which may be the processed input pixel data) of the respective pixels to generate analysis data. The backlight control circuitry 310 is configured to control the luminance of each light source 420 based at least in part on the analysis data. The analysis data may be also provided to the image processing circuitry 304. In such embodiments, the image processing performed by the image processing circuitry 304 may be based on the analysis data.

In one or more embodiments, the analysis data may include average picture levels (APLs) calculated for the respective light sources 420. The APL for a light source 420 is calculated based on input pixel data for a set of pixels positioned near the light source 420. In one implementation, a set of pixels near the light source 420 are selected and the APL of the selected pixels are calculated for the light source 420. The selection of the pixels used to calculate the APL for each light source 420 will be described later in detail.

The calculation of the APL for each light source 420 may be based on “brightness values” of the pixels selected for each light source 420. The “brightness values” for the relevant pixels may be calculated from input pixel data for the relevant pixels and the APL for each light source 420 may be calculated as an average of “brightness values” of the selected set of pixels for each light source 420. In embodiments where input pixel data for each pixel include R, G, and B greylevels, and the image analysis circuitry 308 may be configured to determine the brightness value for each pixel based on the R, G, and B greylevels. In one implementation, the image analysis circuitry 308 may be configured to determine a brightness value for each pixel as the “value” defined in the HSV color model, where “HSV” stands for “hue”, “saturation”, and “value”. In this case, the image analysis circuitry 308 may be configured to determine a brightness value for each pixel as the largest one of the R, G, and B greylevels for each pixel. Alternatively, the image analysis circuitry 308 may be configured to determine a brightness value for each pixel in a different manner. For example, the determination of the brightness value for each pixel may be based on the YUV color model, which defines one luminance component Y and two chrominance components U (blue projection) and V (red projection). In such embodiments, the image analysis circuitry 308 may be configured to calculate a brightness value for each pixel as the luminance Y defined in the YUV color model based on the R, G, and B greylevels for each pixel.

Figure 7:
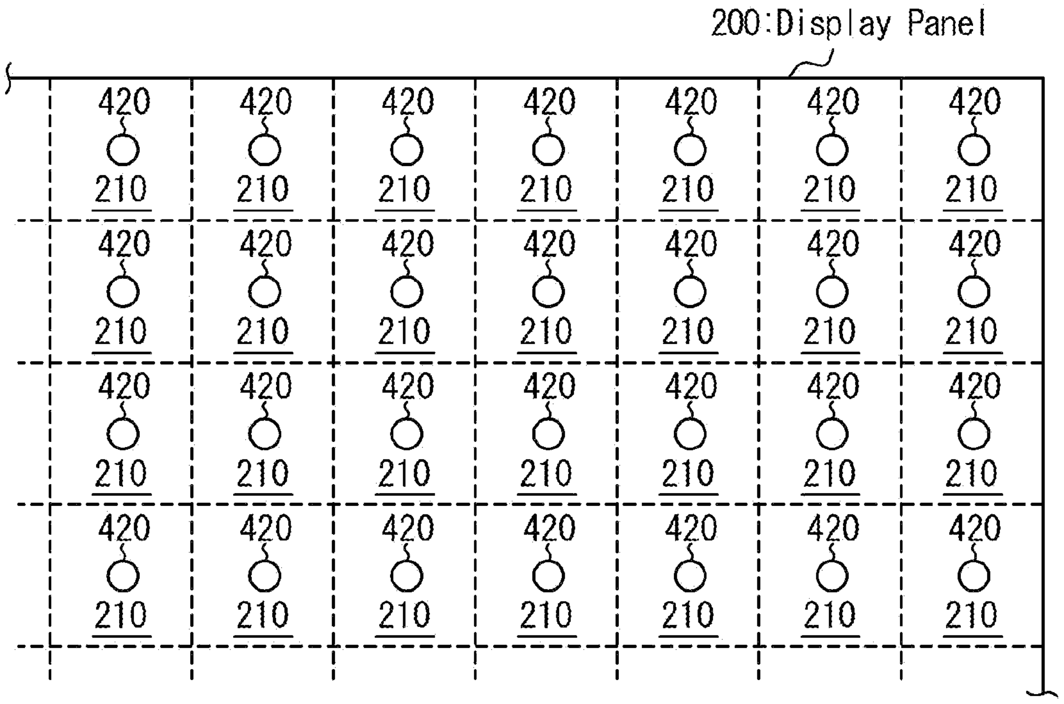
FIG. 7 shows example arrangements of light sources and display sections, according to one or more embodiments.

Referring to FIG. 7, the selection of pixels used to calculate the APL for each light source 420 may be based on display sections 210 each incorporating a set of arrayed pixels. The display sections 210 are defined in rows and columns to encompass the entire display panel 200. The display sections 210 are in one-to-one correspondence with the light sources 420 such that each display section 210 faces the corresponding light source 420. In one or more embodiments, the APL for a light source 420 of interest may be calculated based on input pixel data of a set of pixels located in the display section 210 corresponding to the light source 420 and its surrounding display sections 210. In one implementation, the APL for the light source 420 of interest may be determined as the average of the "brightness values" calculated from the input pixel data of the pixels located in the display section 210 corresponding to the light source 420 and its surrounding display sections 210.

Figure 8A:
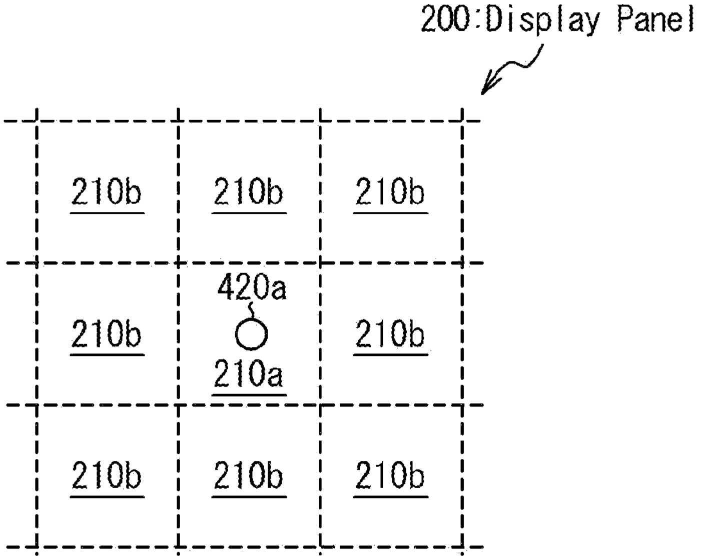
FIGS. 8A, 8B, 8C, and 8D show example selection of pixels in calculating an average picture level (APL) for light sources, according to one or more embodiments.

FIG. 8A shows example selection of pixels in calculating the APL for a light source 420*a* positioned in the inner portion of the backlight array, according to one or more embodiments. In FIG. 8A, the light source 420*a* faces the display section 210*a* and there are eight surrounding display sections 210*b* around the display section 210*a*. Accordingly, the APL for the light source 420*a* is calculated based on input pixel data of pixels located in the display section 210*a* and its eight surrounding display sections 210*b*. In one implementation, the APL for the light source 420*a* may be determined as the average of the "brightness values" calculated from the input pixel data of the pixels located in the display section 210*a* and the surrounding display sections 210*b*.

Figure 8B:
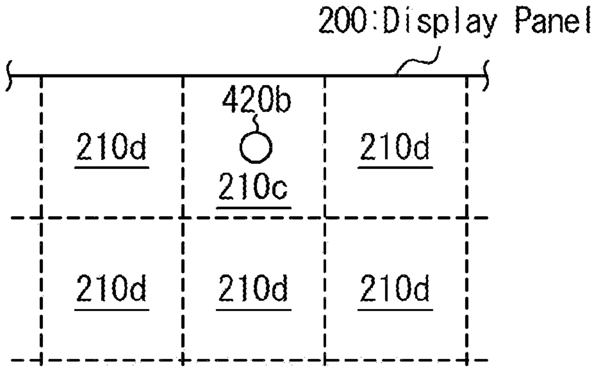

FIG. 8B shows example selection of pixels in calculating the APL for a light source 420*b* positioned at the top edge of the backlight array, according to one or more embodiments. In FIG. 8B, the light source 420*b* faces the display section 210*c* and there are five surrounding display sections 210*d* around the display section 210*c*. Accordingly, the APL for the light source 420*b* is calculated based on input pixel data of pixels located in the display section 210*c* and its five surrounding display sections 210*d*. In one implementation, the APL for the light source 420*b* may be determined as the average of the "brightness values" calculated from the input pixel data of the pixels located in the display section 210*c* and the surrounding display sections 210*d*.

Figure 8C:
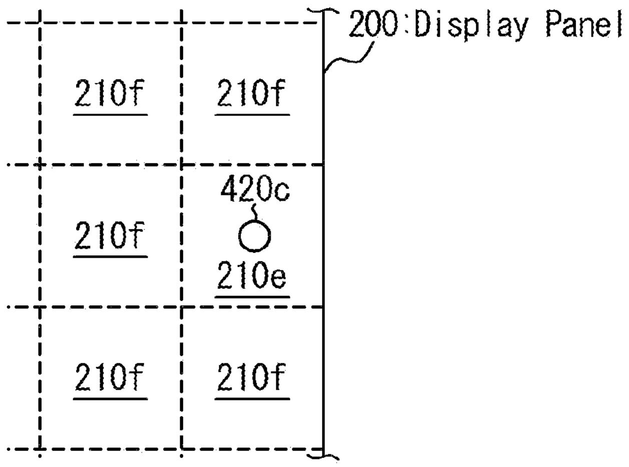

FIG. 8C shows example selection of pixels in calculating the APL for a light source 420*c* positioned at the right edge of the backlight array, according to one or more embodiments. In FIG. 8C, the light source 420*c* faces the display section 210*e* and there are five surrounding display sections 210*f* around the display section 210*e*. Accordingly, the APL for the light source 420*c* is calculated based on input pixel data of pixels located in the display section 210*e* and its five surrounding display sections 210*f*. In one implementation, the APL for the light source 420*c* may be determined as the average of the "brightness values" calculated from the input pixel data of the pixels located in the display section 210*e* and the surrounding display sections 210*f*.

Figure 8D:
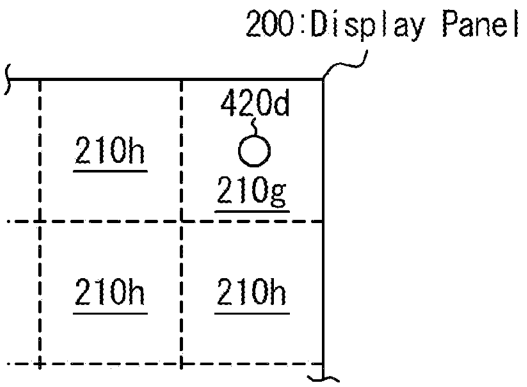

FIG. 8D shows example selection of pixels in calculating the APL for a light source 420*d* positioned at the corner of the backlight array, according to one or more embodiments. In FIG. 8D, the light source 420*d* faces the display section 210*g* and there are three surrounding display sections 210*h* around the display section 210*g*. Accordingly, the APL for the light source 420*d* is calculated based on input pixel data of pixels located in the display section 210*g* and its three surrounding display sections 210*h*. In one implementation, the APL for the light source 420*d* may be determined as the average of the "brightness values" calculated from the input pixel data of the pixels located in the display section 210*g* and the surrounding display sections 210*h*.

Figure 9:
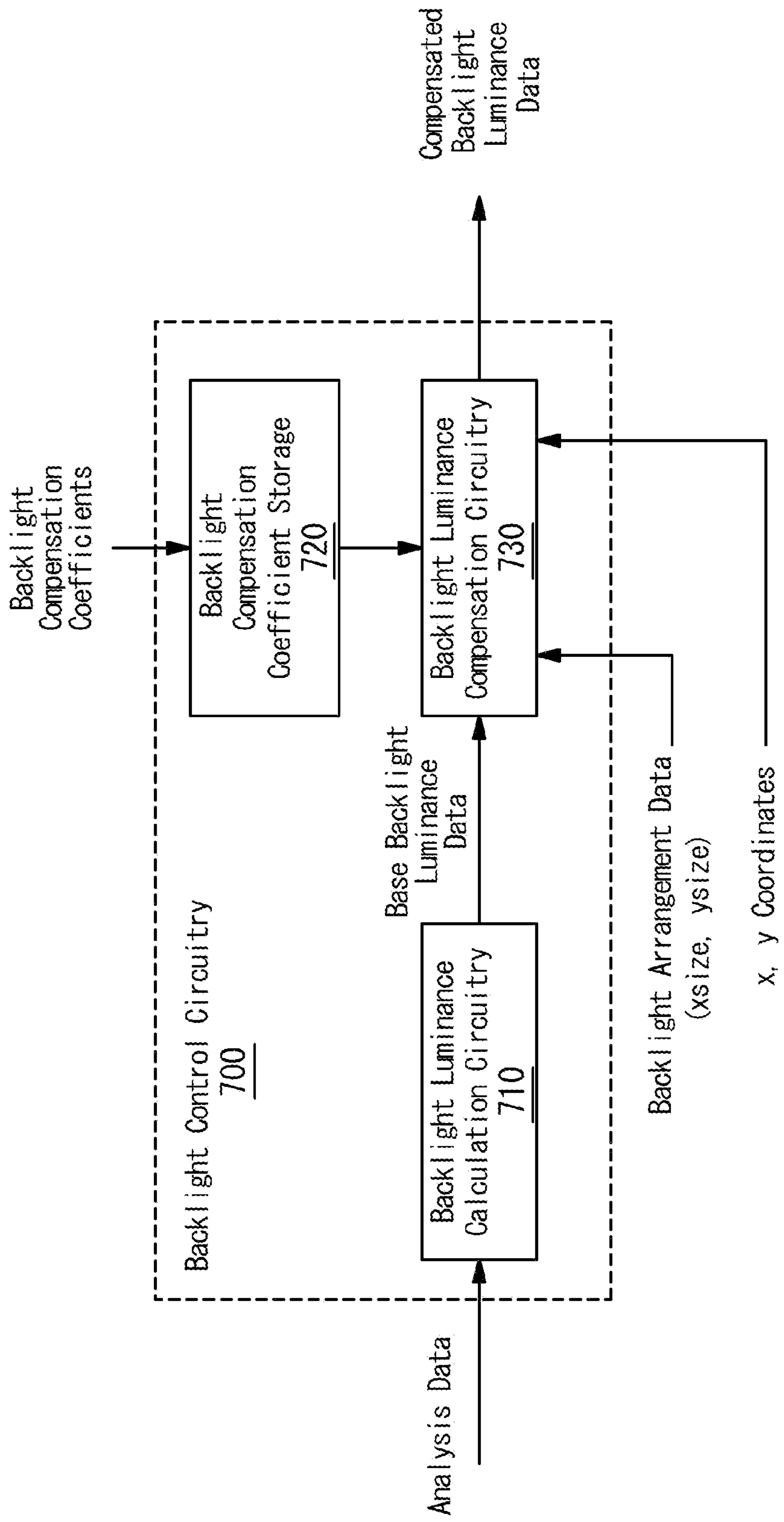
FIG. 9 shows an example configuration of backlight control circuitry, according to one or more embodiments.

FIG. 9 shows an example configuration of backlight control circuitry 700, according to one or more embodiments. The backlight control circuitry 700 may be one embodiment of the backlight control circuitry 310 shown in FIG. 6. In the shown embodiment, the backlight control circuitry 700 includes backlight luminance calculation circuitry 710, backlight compensation coefficient storage 720, and backlight luminance compensation circuitry 730.

The backlight luminance calculation circuitry 710 is configured to generate base backlight luminance data based on the analysis data received from the image analysis circuitry 308 (shown in FIG. 6). The base backlight luminance data includes base luminance for each light source 420. The base luminance of a light source 420 may be specified luminance determined based on the input pixel data to achieve local dimming. In embodiments where the analysis data includes the APL calculated for each light source 420 as described in relation to FIGS. 7 and 8A to 8D, the base luminance for each light source 420 is determined based on the APL calculated for each light source 420. In one implementation, the base luminance for a light source 420 increases with an increase in the APL calculated for each light source 420.

The backlight compensation coefficient storage 720 is configured to store backlight compensation coefficients used for luminance compensation of the respective light sources 420. In some embodiments, the backlight compensation coefficient storage 720 may be configured to store backlight compensation coefficients for the respective light sources 420. In other embodiments, the backlight compensation coefficient storage 720 may be configured to store backlight compensation coefficients for the respective light source categories as described in relation to FIGS. 2A-2C and 3A-3C. In one embodiment, the backlight compensation coefficients may be programed in a calibration process of the display driver 300. In an alternative embodiment, the backlight compensation coefficients may be received from the controller 600 (shown in FIG. 4) during operation of the display device 1000.

The backlight luminance compensation circuitry 730 is configured to retrieve backlight compensation coefficients from the backlight compensation coefficient storage 720 and generate compensated backlight luminance data by applying the backlight compensation coefficients to the base backlight luminance data received from the backlight luminance calculation circuitry 710. The compensated backlight luminance data includes compensated luminance for each light source 420. The compensated luminance of a light source 420 of interest is determined by selecting a backlight compensation coefficient from among the backlight compensation coefficients stored in the backlight compensation coefficient storage 720 and applying the selected backlight compensation coefficient to the base luminance of the light source 420 of interest, which is indicated in the base backlight luminance data. The selection of the backlight compensation coefficient for the light source 420 of interest is based on backlight arrangement data and the position of the light source 420 of interest, which may be indicated by x and y coordinates of the light source 420 of interest in the backlight array 410. The backlight arrangement data indicates how the light sources 420 are arranged in the backlight array 410. In the embodiment shown in FIG. 7, the backlight arrangement data may include the number of columns of the light sources 420 in the backlight array 410, which is denoted by "xsize", and the number of rows of the light sources 420, which is denoted by "ysize."

The compensated backlight luminance data is used to control light emission of the respective light sources 420. In one embodiment, the compensated backlight luminance data is provided to the backlight driver 500 (shown in FIG. 6), and the backlight driver 500 is configured to control light emission of each light source 420 based on the compensated luminance of each light source 420 specified by the compensated backlight luminance data.

Figure 10:
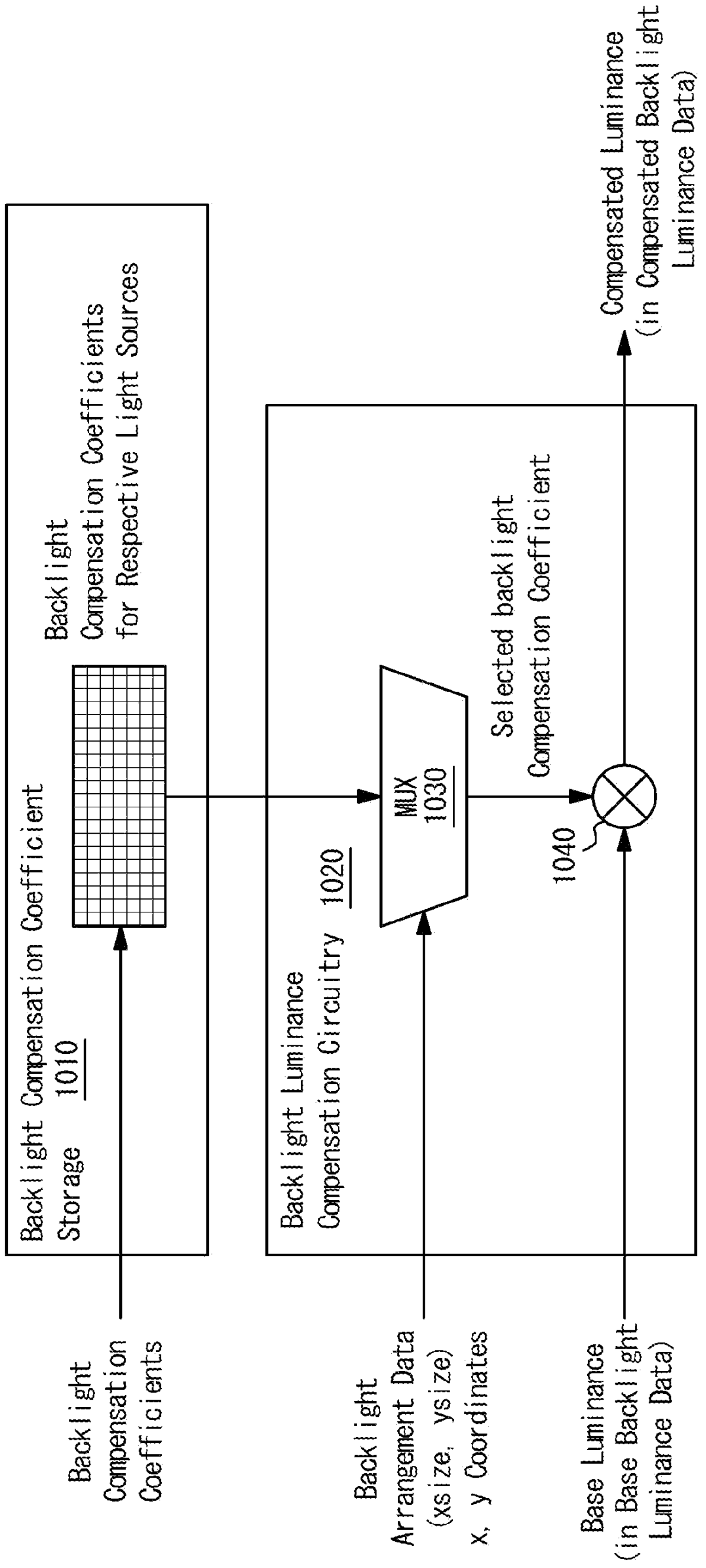
FIG. 10 shows example configurations of a backlight compensation coefficient storage and backlight luminance compensation circuitry, according to one or more embodiments.

FIG. 10 shows example configurations of backlight compensation coefficient storage 1010 and backlight luminance compensation circuitry 1020, according to one or more embodiments. The backlight compensation coefficient storage 1010 may be one embodiment of the backlight compensation coefficient storage 720 shown in FIG. 9, and the backlight luminance compensation circuitry 1020 may be one embodiment of the backlight luminance compensation circuitry 730 shown in FIG. 9. In the shown embodiment, the backlight compensation coefficient storage 1010 is configured to store backlight compensation coefficients for the respective light sources 420. It is noted that, in the embodiment shown in FIG. 10, the number of the backlight compensation coefficients stored in the backlight compensation coefficient storage 1010 is the same as the number of the light sources 420 in the backlight array 410. In embodiments where the number of the light sources 420 in the backlight array 410 is 2048, for example, the number of the backlight compensation coefficients stored in the backlight compensation coefficient storage 1010 is also 2048.

The backlight luminance compensation circuitry 1020 includes a multiplexer 1030 and modifier circuitry 1040. The multiplexer 1030 is configured to select a backlight compensation coefficient for each light source 420 from among the backlight compensation coefficients stored in the backlight compensation coefficient storage 1010 based on the backlight arrangement data (which may include "xsize" and "ysize") and the position of each light source 420 (which may be indicated by x and y coordinates). The modifier circuitry 1040 is configured to apply the selected backlight compensation coefficient to the base luminance for each light source 420 to determine the compensated luminance for each light source 420. It is noted that the base luminance for each light source 420 is derived from the base backlight luminance data received from the backlight luminance calculation circuitry 710 while the compensated luminance for each light source 420 is incorporated into the compensated backlight luminance data. In one implementation, the modifier circuitry 1040 may be configured as a multiplier that multiplies the base luminance for each light source 420 by the selected backlight compensation coefficient to determine the compensated luminance for each light source 420. In an alternative implementation, the modifier circuitry 1040 may be configured to apply a different arithmetic operation (e.g., addition, subtraction, division, etc.) to the base luminance using the selected backlight compensation coefficient to determine the compensated luminance.

Figure 11:
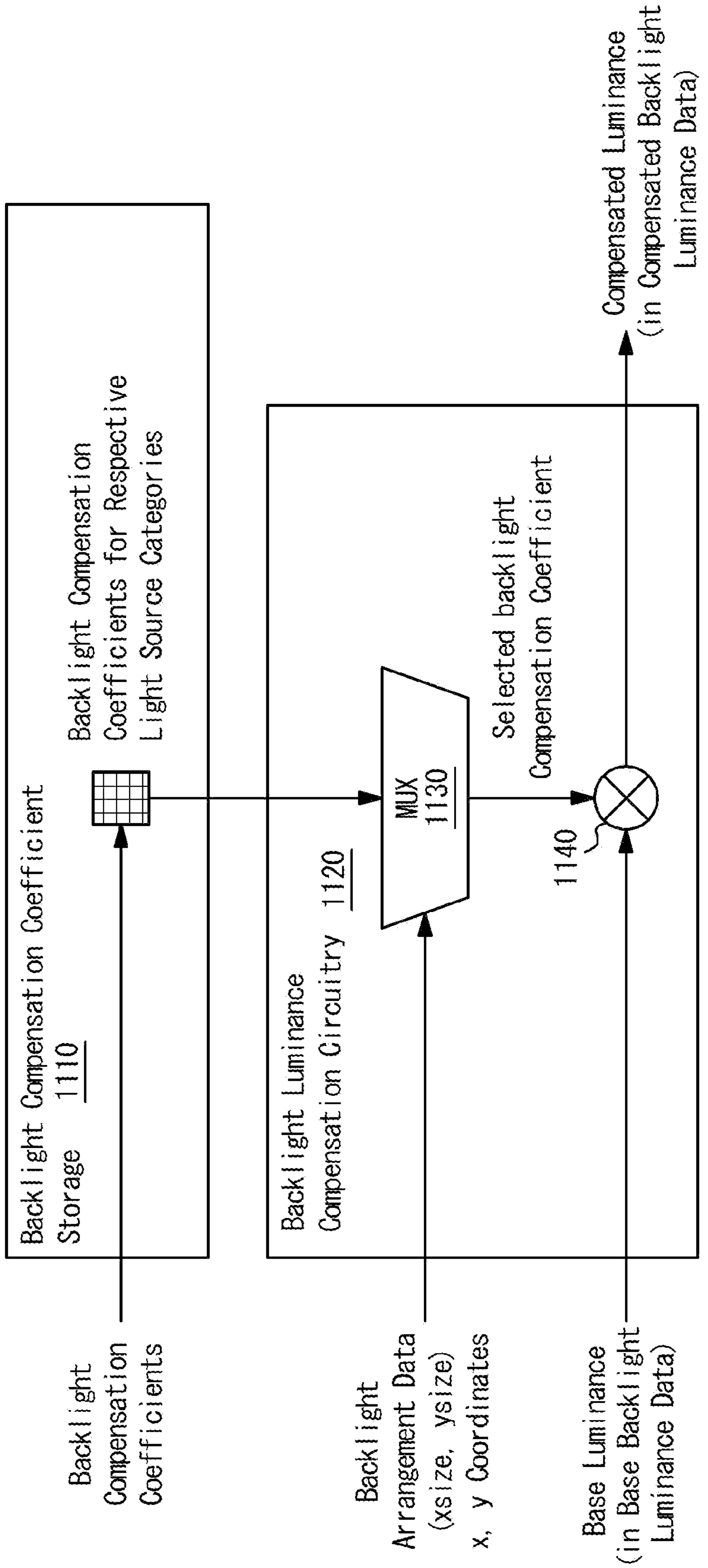
FIG. 11 shows example configurations of a backlight compensation coefficient storage and backlight luminance compensation circuitry, according to other embodiments.

FIG. 11 shows example configurations of backlight compensation coefficient storage 1110 and backlight luminance compensation circuitry 1120, according to other embodiments. The backlight compensation coefficient storage 1110 may be one embodiment of the backlight compensation coefficient storage 720 shown in FIG. 9, and the backlight luminance compensation circuitry 1120 may be one embodiment of the backlight luminance compensation circuitry 730 shown in FIG. 9.

In the shown embodiment, the backlight compensation coefficient storage 1110 is configured to store backlight compensation coefficients for respective "light source categories", which are defined for the backlight array 410 as described in relation to FIGS. 2A to 2C and 3A to 3C. It is noted that the number of the stored backlight compensation coefficients is equal to the number of the light source categories and less than the number of the light sources 420 in the backlight array 410.

The backlight luminance compensation circuitry 1120 includes a multiplexer 1130 and modifier circuitry 1140. In the embodiment shown in FIG. 11, the multiplexer 1130 is configured to identify the light source category to which each light source 420 belongs based on the backlight arrangement data and the position of each light source 420. The backlight arrangement data may include "xsize" and "ysize", which respectively indicate the number of columns of the light sources 420 and the number of rows of the light sources 420. The position of each light source 420 may be indicated by the x and y coordinates of each light source 420. The multiplexer 1130 is further configured to select the backlight compensation coefficient corresponding to the identified light source category for each light source 420 from among the backlight compensation coefficients stored in the backlight compensation coefficient storage 1110. In the embodiment shown in FIG. 2A, for example, when a light source of interest is positioned at the corner of the backlight array 410 and therefore belongs to the light source category "Corners", the multiplexer 1130 selects the backlight compensation coefficient corresponding to the light source category "Corners." In another example, when the light source of interest is positioned at the top edge of the backlight array 410 and therefore belongs to the light source category "Top and Bottom Edges", the multiplexer 1130 selects the backlight compensation coefficient corresponding to the light source category "Top and Bottom Edges." The same goes for other light source categories shown in FIGS. 2A-2C. The modifier circuitry 1140 is configured to apply the selected backlight compensation coefficient to the base luminance for each light source 420 to determine the compensated luminance for each light source 420. In one implementation, the modifier circuitry 1140 may be configured as a multiplier that multiplies the base luminance for each light source 420 by the selected backlight compensation coefficient to determine the compensated luminance for each light source 420.

The embodiment shown in FIG. 11 effectively reduces the number of the backlight compensation coefficients to be stored in the backlight compensation coefficient storage 1110 compared with the embodiment shown in FIG. 10. The reduction in the number of the stored backlight compensation coefficients effectively reduces hardware used to implement the backlight compensation coefficient storage 1110.

Figure 12:
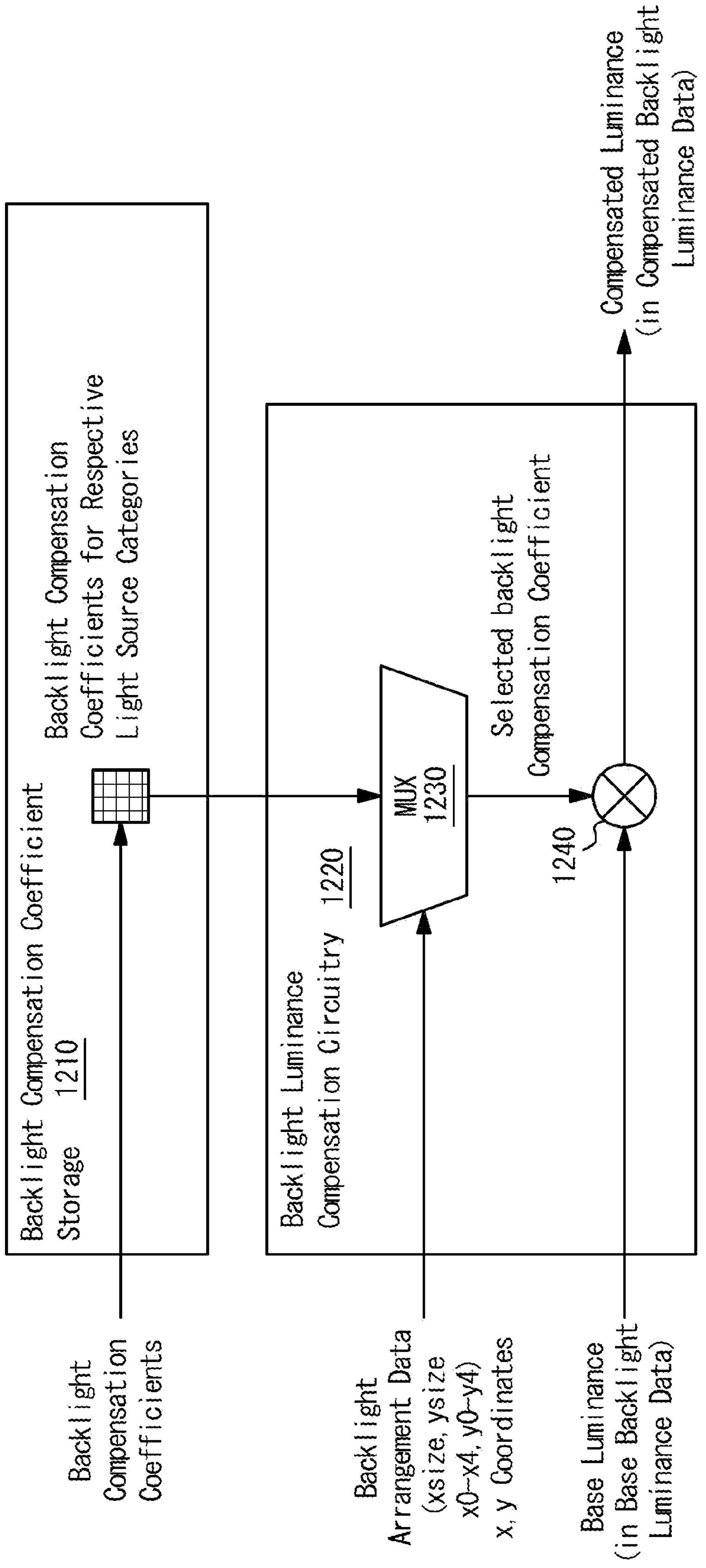
FIG. 12 shows example configurations of a backlight compensation coefficient storage and backlight luminance compensation circuitry, according to other embodiments.

FIG. 12 shows example configurations of backlight compensation coefficient storage 1210 and backlight luminance compensation circuitry 1220, according to other embodiments. The backlight compensation coefficient storage 1210 may be one embodiment of the backlight compensation coefficient storage 720 shown in FIG. 9, and the backlight luminance compensation circuitry 1220 may be one embodiment of the backlight luminance compensation circuitry 730 shown in FIG. 9.

The embodiment shown in FIG. 12 is adapted to the arrangement of the light sources shown in FIGS. 3A to 3B, in which the corners of the backlight array are beveled. The backlight compensation coefficient storage 1210 is configured to store backlight compensation coefficients for respective "light source categories" similarly to the backlight compensation coefficient storage 1110 shown in FIG. 11. The backlight luminance compensation circuitry 1220 includes a multiplexer 1230 and modifier circuitry 1240. The multiplexer 1230 is configured to identify, based on the backlight arrangement data and the position of each light source 420, the light source category to which each light source 420 belongs. In the embodiment shown in FIG. 12, the backlight arrangement data includes "xsize" and "ysize", and further includes parameters indicating the arrangement of the light sources at the corners of the backlight array. In one implementation, the backlight arrangement data may include x0-x4 and y0-y4 as described in relation to FIGS. 3A to 3C and/or other parameters that indicate the arrangement of the light sources at the corners of the backlight array. Based on the backlight arrangement data and the position of each light source 420, the multiplexer 1230 is configured to identify the light source category to which each light source 420 belongs. The multiplexer 1230 is further configured to select the backlight compensation coefficient corresponding to the identified light source category for each light source 420 from among the backlight compensation coefficients stored in the backlight compensation coefficient storage 1210. The modifier circuitry 1240 is configured to apply the selected backlight compensation coefficient to the base luminance for each light source 420 to determine the compensated luminance for each light source 420. In one implementation, the modifier circuitry 1240 may be configured as a multiplier that multiplies the base luminance for each light source 420 by the selected backlight compensation coefficient to determine the compensated luminance for each light source 420.

In one or more embodiments, the backlight luminance compensation may be further based on external light intensity and/or environment temperature. In one implementation, the display device may incorporate an external light intensity sensor (not shown) and/or an environment temperature sensor (not shown). The external light intensity sensor may be configured to measure the external light intensity and the environment temperature sensor may be configured to measure the environmental temperature. The measured external light intensity and/or environmental temperature may be used to adjust the compensated luminance of each light source 420.

Figure 13:
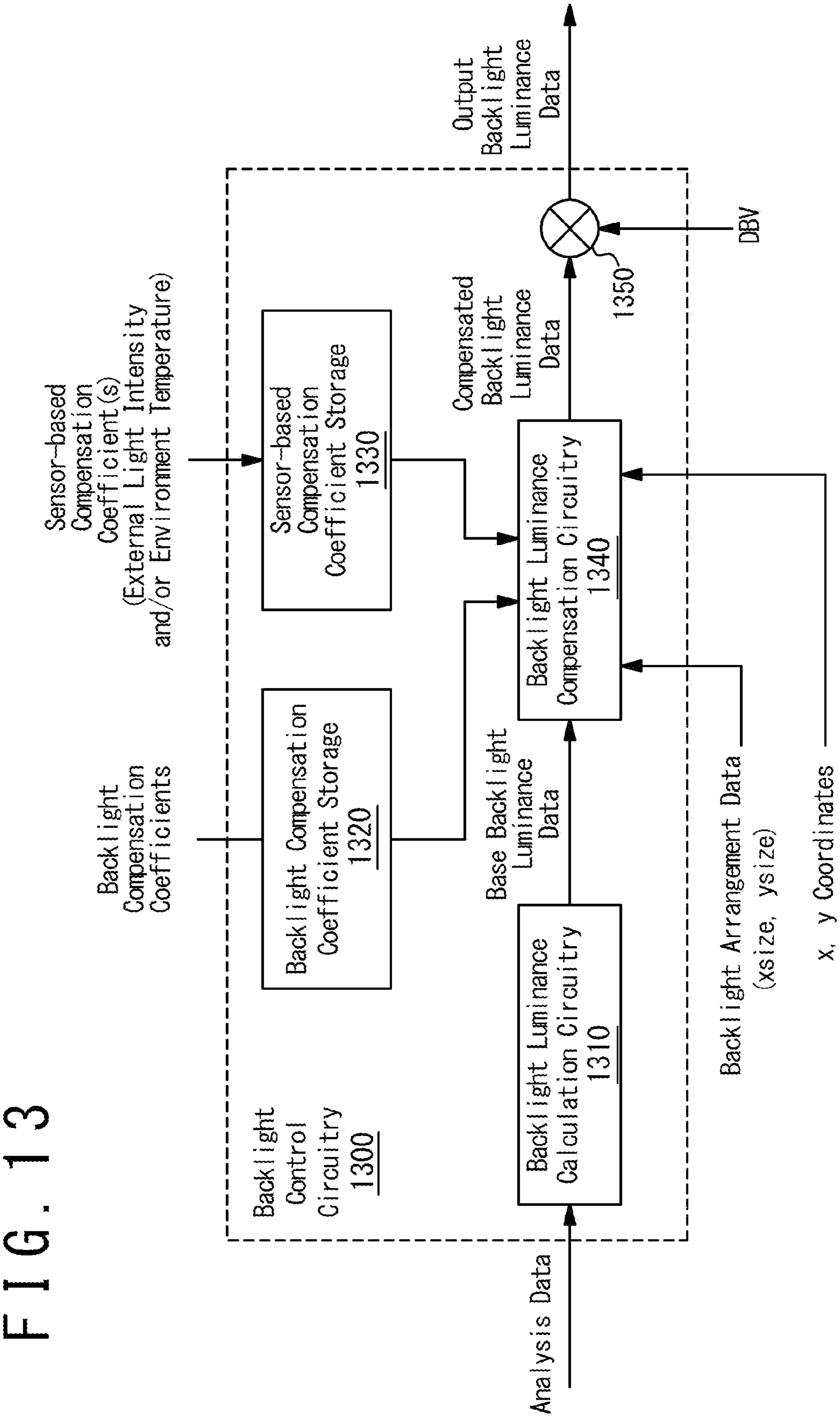
FIG. 13 shows an example configuration of backlight control circuitry, according to one or more embodiments

FIG. 13 shows an example configuration of backlight control circuitry 1300 in which the backlight luminance compensation is further based on external light intensity and/or environment temperature, according to one or more embodiments. The backlight control circuitry 1300 may be one embodiment of the backlight control circuitry 310 shown in FIG. 6. In the shown embodiment, the backlight control circuitry 1300 includes backlight luminance calculation circuitry 1310, backlight compensation coefficient storage 1320, sensor-based compensation coefficient storage 1330, backlight luminance compensation circuitry 1340, and modifier circuitry 1350.

The backlight luminance calculation circuitry 1310 is configured to generate base backlight luminance data based on the analysis data in a similar manner to the backlight luminance calculation circuitry 710 shown in FIG. 9. The base backlight luminance data includes base luminance for each light source 420.

The backlight compensation coefficient storage 1320 is configured to store backlight compensation coefficients used for luminance compensation of the respective light sources 420. In some embodiments, the backlight compensation coefficient storage 1320 may be configured to store backlight compensation coefficients for the respective light sources 420. In other embodiments, the backlight compensation coefficient storage 1320 may be configured to store backlight compensation coefficients for the respective light source categories as described in relation to FIGS. 2A-2C and 3A-3C. In one embodiment, the backlight compensation coefficients may be programed in a calibration process of the display driver 300. In an alternative embodiment, the backlight compensation coefficients may be received from the controller 600 (shown in FIG. 4) during operation of the display device 1000.

The sensor-based compensation coefficient storage 1330 is configured to store one or more sensor-based compensation coefficients used for luminance compensation of the respective light sources 420. The one or more sensor-based compensation coefficients are generated based on the measured external light intensity and/or environmental temperature. In one implementation, a processor integrated in the display driver 300 may be configured to receive sensor outputs from the external light sensor and/or the environmental temperature sensor and generate the sensor-based compensation coefficients based on the sensor outputs. In an alternative implementation, the controller 600 (shown in FIG. 4) may be configured to receive sensor outputs from the external light sensor and/or the environmental temperature sensor and generate the sensor-based compensation coefficients based on the sensor outputs.

The backlight luminance compensation circuitry 1340 is configured to generate compensated backlight luminance data by modifying the base backlight luminance data received from the backlight luminance calculation circuitry 1310 based on the backlight compensation coefficients received from the backlight compensation coefficient storage 1320 and the one or more sensor-based compensation coefficients received from the sensor-based compensation coefficient storage 1330. It is noted that the base backlight luminance data includes base luminance of each light source 420 and the compensated backlight luminance data includes compensated luminance of each light source 420.

The modifier circuitry 1350 is configured to modify the compensated backlight luminance data based on a display brightness value (DBV) to generate output backlight luminance data. The DBV indicates a specified display brightness level of the display panel 200. The display brightness level referred herein is the overall brightness level of the image displayed on the display panel 200. The DBV may be based on a user brightness setting that specifies a desired display brightness level. The DBV may be generated based on a user operation. The output backlight luminance data includes output luminance for each light source 420. The modifier circuitry 1350 is configured to determine the output luminance for each light source 420 by multiplying the compensated luminance for each light source 420 by a factor determined based on the DBV. In the embodiment shown in FIG. 13, the output backlight luminance data is provided to the backlight driver 500 (shown in FIG. 6) and the backlight driver 500 is configured to control light emission of each light source 420 based on the output luminance of each light source 420 specified by the output backlight luminance data. In one implementation, the backlight driver 500 is configured to drive each light source 420 to emit light with the output luminance specified by the output backlight luminance data.

Figure 14:
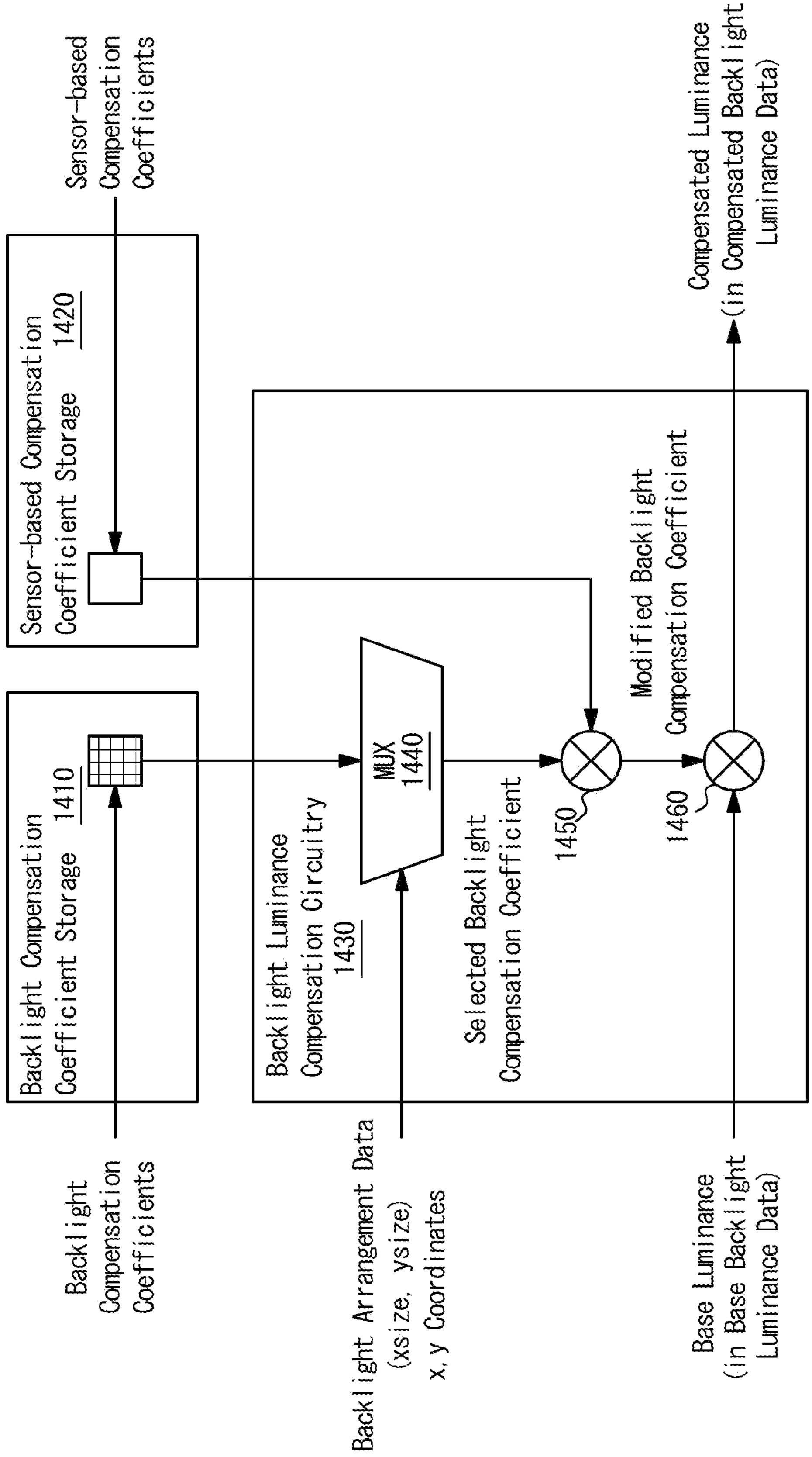
FIG. 14 shows example configurations of a backlight compensation coefficient storage, a sensor-based compensation coefficient storage, and backlight luminance compensation circuitry, according to one or more embodiments.

FIG. 14 shows example configurations of a backlight compensation coefficient storage 1410, a sensor-based compensation coefficient storage 1420, and backlight luminance compensation circuitry 1430, according to one or more embodiments. The backlight compensation coefficient storage 1410 may be one embodiment of the backlight compensation coefficient storage 1320 shown in FIG. 13 and the sensor-based compensation coefficient storage 1420 may be one embodiment of the sensor-based compensation coefficient storage 1330 shown in FIG. 13. The backlight luminance compensation circuitry 1430 may be one embodiment of the backlight luminance compensation circuitry 1340 shown in FIG. 13.

The backlight compensation coefficient storage 1410 is configured to store backlight compensation coefficients for the respective light source categories. In an alternative implementation, the backlight compensation coefficient storage 1410 may be configured to store backlight compensation coefficients for the respective light sources 420. The sensor-based compensation coefficient storage 1420 is configured to store a sensor based compensation coefficient determined based on the measured external light intensity and/or environment temperature.

The backlight luminance compensation circuitry 1430 includes a multiplexer 1440, first modifier circuitry 1450, and second modifier circuitry 1460. The multiplexer 1440 is configured to select a backlight compensation coefficient for each light source 420 from among the backlight compensation coefficients stored in the backlight compensation coefficient storage 1010 based on the backlight arrangement data (which may include "xsize" and "ysize") and the position of each light source 420 (which may be indicated by x and y coordinates).

The first modifier circuitry 1450 is configured to apply the sensor-based compensation coefficient to the selected backlight compensation coefficient to generate a modified backlight compensation coefficient for each light source 420. In one implementation, the first modifier circuitry 1450 may be configured to multiply the selected backlight compensation coefficient by the sensor-based compensation coefficient to generate the modified backlight compensation coefficient. In an alternative implementation, the first modifier circuitry 1450 may be configured to apply a different arithmetic operation (e.g., addition, subtraction, division, etc.) to the selected backlight compensation coefficient using the sensor-based compensation coefficient to generate the modified backlight compensation coefficient.

The second modifier circuitry 1460 is configured to apply the modified backlight compensation coefficient to the base luminance for each light source 420 to determine the compensated luminance for each light source 420. It is noted that the base luminance for each light source 420 is derived from the base backlight luminance data received from the backlight luminance calculation circuitry 710 while the compensated luminance for each light source 420 is incorporated into the compensated backlight luminance data. In one implementation, the second modifier circuitry 1460 may be configured to multiply the base luminance for each light source 420 by the modified backlight compensation coefficient to determine the compensated luminance for each light source 420. In an alternative implementation, the second modifier circuitry 1460 may be configured to apply a different arithmetic operation (e.g., addition, subtraction, division, etc.) to the base luminance using the modified backlight compensation coefficient to determine the compensated luminance.

Figure 15:
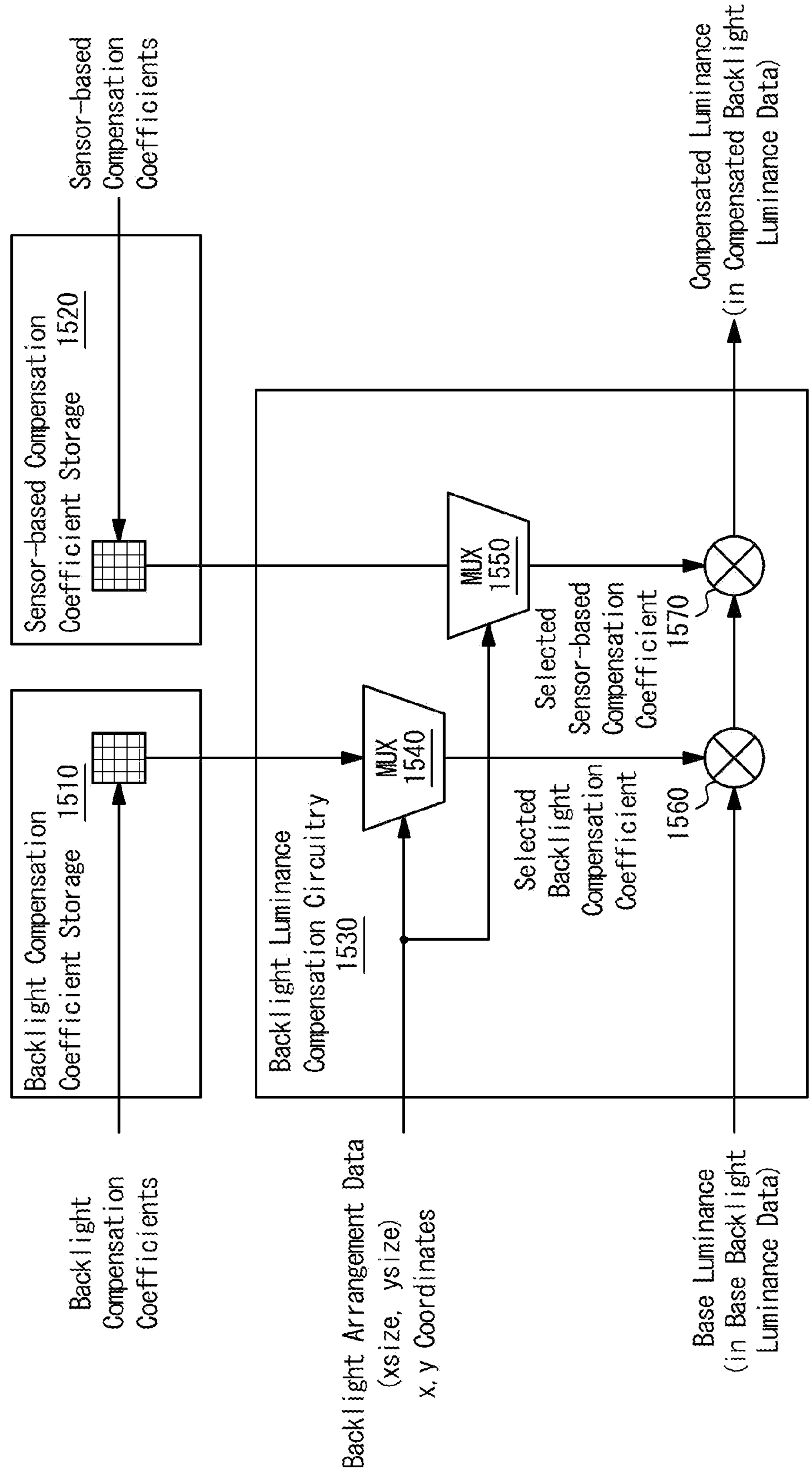
FIG. 15 shows example configurations of a backlight compensation coefficient storage, a sensor-based compensation coefficient storage, and backlight luminance compensation circuitry, according to one or more embodiments.

FIG. 15 shows example configurations of a backlight compensation coefficient storage 1510, a sensor-based compensation coefficient storage 1520, and backlight luminance compensation circuitry 1530, according to other embodiments. The backlight compensation coefficient storage 1510 may be one embodiment of the backlight compensation coefficient storage 1320 shown in FIG. 13 and the sensor-based compensation coefficient storage 1520 may be one embodiment of the sensor-based compensation coefficient storage 1330 shown in FIG. 13. The backlight luminance compensation circuitry 1530 may be one embodiment of the backlight luminance compensation circuitry 1340 shown in FIG. 13.

The backlight compensation coefficient storage 1510 is configured to store backlight compensation coefficients for the respective light source categories. In an alternative implementation, the backlight compensation coefficient storage 1510 may be configured to store backlight compensation coefficients for the respective light sources 420.

The sensor-based compensation coefficient storage 1520 is configured to store sensor-based compensation coefficients for the respective light source categories. The stored sensor-based compensation coefficients are generated based on the measured external light intensity and/or environment temperature for the respective light source categories. In an alternative implementation, the sensor-based compensation coefficient storage 1520 may be configured to store sensor-based compensation coefficients for the respective light sources 420.

The backlight luminance compensation circuitry 1530 includes a first multiplexer 1540, a second multiplexer 1550, first modifier circuitry 1560, and second modifier circuitry 1570. The first multiplexer 1540 is configured to select a backlight compensation coefficient for each light source 420 from among the backlight compensation coefficients stored in the backlight compensation coefficient storage 1510 based on the backlight arrangement data (which may include "xsize" and "ysize") and the position of each light source 420 (which may be indicated by x and y coordinates). The second multiplexer 1550 is configured to select a sensor-based backlight compensation coefficient for each light source 420 from among the sensor-based compensation coefficients stored in the sensor-based compensation coefficient storage 1520 based on the backlight arrangement data and the position of each light source 420.

The first modifier circuitry 1560 and the second modifier circuitry 1570 are collectively configured to apply the selected backlight compensation coefficient and the selected sensor-based backlight compensation coefficient to the base luminance for each light source 420 to determine the compensated luminance for each light source 420. In one implementation, the first modifier circuitry 1560 may be configured to multiply the base luminance for each light source 420 by the selected backlight compensation coefficient, and the second modifier circuitry 1570 may be configured to multiply the output of the first modifier circuitry 1560 by the selected sensor-based backlight compensation coefficient to determine the compensated luminance for each light source 420. In an alternative implementation, the first modifier circuitry 1560 and the second modifier circuitry 1570 may be configured to apply a different arithmetic operation (e.g., addition, subtraction, division, etc.) to the base luminance using the selected backlight compensation coefficient and the selected sensor-based backlight compensation coefficient to determine the compensated luminance.

Figure 16A:
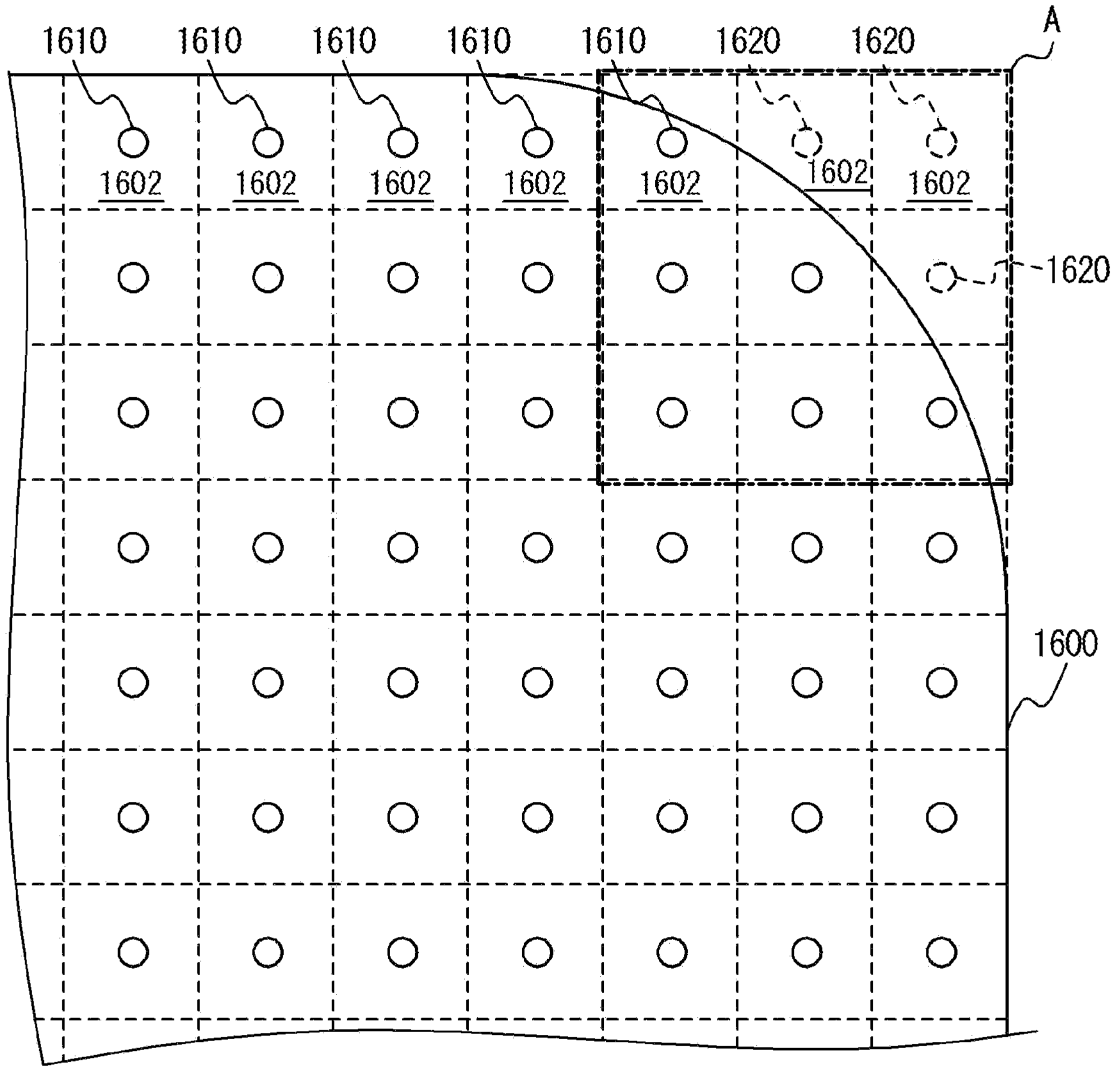
FIG. 16A shows an example configuration of a display panel and an example arrangement of light sources in a backlight array, according to one or more embodiments.

FIG. 16A shows an example configuration of a corner-rounded display panel 1600 and an example arrangement of light sources 1610 in a backlight array, according to one or more embodiments. The corner-rounded display panel 1600 may be one embodiment of the display panel 200 shown in FIG. 4, and the backlight array with the light sources 1610 may be one embodiment of the backlight array 410 with the light sources 420 shown in FIG. 4.

In the shown embodiment, the corners (one shown) of the display panel 1600 are rounded while the corners of the backlight array are beveled in accordance with the shape of the corners of the display panel 1600, omitting light sources outside of the corners of the display panel 1600. The numeral 1620 in FIG. 16A indicates these omitted light sources. As described later in detail, luminance compensation processing hypothetically involves the omitted light sources, and the "omitted" light sources may be referred to as "hypothetically-defined" light sources.

Similarly to the embodiment shown in FIG. 7, display sections 1602 are defined in rows and columns to encompass the entire display panel 1600 such that each display section 1602 corresponds to one of the light sources 1610 or one of the hypothetically-defined light sources 1620. As discussed later in detail, the display sections 1602 are used to determine base luminance for each light source 1610 and each hypothetically-defined light source 1620.

In the embodiment shown in FIG. 16A, image data corresponding to rectangular images that circumscribe the corner-rounded display panel 1600 is provided to the display driver to drive or update the pixels in the display panel 1600. The use of image data of rectangular images reduces irregularity of the driving operation potentially caused by the rounded corners of the display panel 1600, effectively simplifying the operation of the display driver.

Figure 16B:
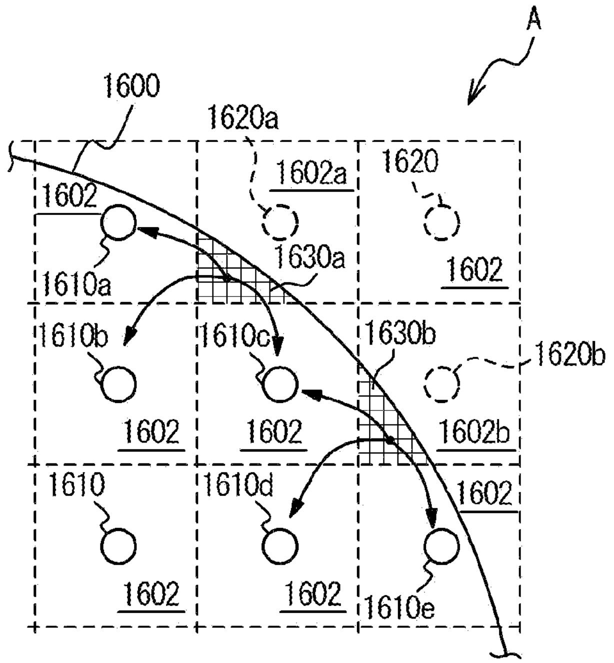
FIG. 16B is an enlarged view of a right top corner of a display panel, according to one or more embodiments.

FIG. 16B shows an enlarged view of the right top corner, denoted by "A" in FIG. 16A, of the display panel 1600, according to one or more embodiments. Since the arrangement of the light sources 1610 is jagged near the rounded corner of the display panel 1600, edge regions at the rounded corner of the display panel 1600 may not be sufficiently illuminated by the light sources 1610. In FIG. 16B, numeral 1630*a* and 1630*b* denote insufficiently-illuminated edge regions. The edge region 1630*a* is positioned in the display section 1602*a* in which no light source is disposed, where the absence of the light source is indicated by the hypothetically-defined light source 1620*a*. Similarly, the edge region 1630*b* is positioned in the display section 1602*b* in which no light source is disposed, where the absence of the light source is indicated by the hypothetically-defined light source 1620*b*. Due to the absence of light sources, the image brightness may be decreased in the edge regions 1630*a* and 1630*b*.

In one or more embodiments, the luminance of the light sources 1610*a*, 1610*b*, 1610*c*, 1610*d*, and 1610*e* located near the edge regions 1630*a* and 1630*b* is adjusted to compensate the decrease in the image brightness in the edge regions 1630*a* and 1630*b*. The compensation of the decrease in the image brightness in the edge regions 1630*a* and 1630*b* may be achieved as follows.

Base luminance of the light sources 1610*a*, 1610*b*, 1610*c*, 1610*d*, 1610*e* and the hypothetically-defined light source 1620*a* and 1620*b* is first determined based on the image data as described in relation to FIG. 9. In one implementation, the base luminance of light source 1610*a* may be determined based on the APL of pixels in the display section 1602 corresponding to the light source 1610*a* and its surrounding display sections 1602. The base luminance of light sources 1610*b*, 1610*c*, 1610*d*, and 1610*e* is determined in a similar manner. The base luminance of the hypothetically-defined light source 1620*a* is determined based on the APL of pixels in the display section 1602*a* (which corresponds to hypothetically-defined light source 1620*a*) and its surrounding display sections 1602. The base luminance of the hypothetically-defined light source 1620*b* is determined based on the APL of pixels in the display section 1602*b* (which corresponds to the hypothetically-defined light source 1620*b*) and its surrounding display sections 1602.

This is followed by determining first compensated luminance of the light sources 1610*a*, 1610*b*, 1610*c*, 1610*d*, and 1610*e* and hypothetically-defined light source 1620*a* and 1620*b* by applying selected brightness compensation coefficients to the base luminance as described in relation to FIG. 10, 11, or 12.

Further, secondary compensated luminance of the light sources 1610*a*, 1610*b*, 1610*c*, 1610*d*, and 1610*e* is then determined by adjusting the first compensated luminance of the light sources 1610*a*, 1610*b*, 1610*c*, 1610*d*, and 1610*e* based on the first compensated luminance of the hypothetically-defined light source 1620*a* and 1620*b*. The secondary compensated luminance of the light sources 1610*a*, 1610*b*, 1610*c*, 1610*d*, and 1610*e* is used to control light emissions of the light sources 1610*a*, 1610*b*, 1610*c*, 1610*d*, and 1610*e*. In the determination of the secondary compensated luminance, the first compensated luminance of the hypothetically-defined light sources 1620*a* and 1620*b* is "distributed" to the light sources adjacent to the hypothetically-defined light sources 1620*a* and 1620*b* to compensate the absence of the light sources in the display sections 1602*a* and 1602*b*. The arrows in FIG. 16B indicate the "distribution" of the first compensated luminance of the hypothetically-defined light sources 1620*a* and 1620*b* to adjacent light sources. The first compensated luminance of the hypothetically-defined light source 1620*a* is "distributed" to the adjacent light sources 1610*a*, 1610*b*, and 1610*c*, and the first compensated luminance of the hypothetically-defined light source 1620*b* is "distributed" to the adjacent light sources 1610*c*, 1610*d*, and 1610*e*.

More specifically, in one or more embodiments, the secondary compensated luminance of the light sources 1610*a*, 1610*b*, 1610*c*, 1610*d*, and 1610*e* may be determined by adding a predetermined proportion of the first compensated luminance of the relevant hypothetically-defined light source(s) (i.e., the hypothetically-defined light sources 1620*a* and/or 1620*b*) to the first compensated luminance of the light sources 1610*a*, 1610*b*, 1610*c*, 1610*d*, and 1610*e*, respectively. In one implementation, the secondary compensated luminance of the light sources 1610*a*, 1610*b*, 1610*c*, 1610*d*, and 1610*e* may be determined in accordance with the following expressions (1a), (1b), (1c), (1d), and (1e):

$$L_{cmp2-1610a} = L_{cmp1-1610a} + k_{a1} \cdot L_{cmp1-1620a}, \tag{1a}$$

$$L_{cmp2-1610b} = L_{cmp1-1610b} + k_{a2} \cdot L_{cmp1-1620a}, \tag{1b}$$

$$L_{cmp2-1610c} = L_{cmp1-1610c} + k_{a3} \cdot L_{cmp1-1620a}, + k_{b1} \cdot L_{cmp1-1620b} \tag{1c}$$

$$L_{cmp2-1610d} = L_{cmp1-1610d} + k_{b2} \cdot L_{cmp1-1620b}, \text{ and} \tag{1d}$$

$$L_{cmp2-1610e} = L_{cmp1-1610e} + k_{b3} \cdot L_{cmp1-1620b}, \tag{1e}$$

where $L_{cmp2-1610a}$, $L_{cmp2-1610b}$, $L_{cmp2-1610c}$, $L_{cmp2-1610d}$, and $L_{cmp2-1610e}$ are the secondary compensated luminance of the light sources 1610*a*, 1610*b*, 1610*c*, 1610*d*, and 1610*e*, respectively; $L_{cmp1-1610a}$, $L_{cmp1-1610b}$, $L_{cmp1-1610c}$, $L_{cmp1-1610d}$, and $L_{cmp1-1610e}$ are the first compensated luminance of the light sources 1610*a*, 1610*b*, 1610*c*, 1610*d* and 1610*e*, respectively; $L_{cmp1-1620a}$ and $L_{cmp1-1620b}$ are the first compensated luminance of the hypothetically-defined light sources 1620*a* and 1620*b*, respectively; $k_{a1}$, $k_{a2}$, and $k_{a3}$ are predetermined distribution weight factors assigned to the light sources 1610*a*, 1610*b*, and 1610*c*, respectively, in relation to the hypothetically-defined light source 1620*a*; and $k_{b1}$, $k_{b2}$, and $k_{b3}$ are predetermined distribution weight factors assigned to the light sources 1610*c*, 1610*d*, and 1610*e*, respectively, in relation to the hypothetically-defined light source 1620*b*. The distribution weight factors $k_{a1}$, $k_{a2}$, and $k_{a3}$ may be determined depending on the distances of the light sources 1610*a*, 1610*b*, and 1610*c* from the hypothetically-defined light source 1620*a*, and the distribution weight factors $k_{b1}$, $k_{b2}$, and $k_{b3}$ may be predetermined depending on the distances of the light sources 1610*c*, 1610*d*, and 1610*e* from the hypothetically-defined light source 1620*b*.

The secondary compensated luminance thus determined is incorporated into the compensated backlight luminance data and used to control the light emission of the light sources 1610. In one implementation, the light emissions of the light sources 1610*a*, 1610*b*, 1610*c*, 1610*d*, and 1610*e* may be controlled based on $L_{cmp2\text{-}1610a}$, $L_{cmp2\text{-}1610b}$, $L_{cmp2\text{-}1610c}$, $L_{cmp2\text{-}1610d}$, and $L_{cmp2\text{-}1610c}$ calculated in accordance with expressions (1a), (1b), (1c), (1d), and (1e), respectively.

While FIGS. 16A and 16B show embodiments for a display panel with rounded corners, the concept of the technology disclosed herein, which involves "distribution" of first compensated luminance of the hypothetically-defined light sources to adjacent light sources, may be applicable to other non-rectangular display panels and non-rectangular backlight arrays. For example, a display panel with a notch may be illuminated by a backlight array with a recess corresponding to the notch of the display panel. In such embodiments, hypothetical light sources may be defined outside of the display panel (e.g., in the recess) and the first compensated luminance of the hypothetically-defined light sources may be "distributed" to their adjacent light sources. More specifically, base luminance of the hypothetically-defined light sources and their adjacent light sources may be first determined based on the image data as described in relation to FIG. 9. This may be followed by determining first compensated luminance of the hypothetically-defined light sources and the adjacent light sources by applying selected brightness compensation coefficients to the base luminance as described in relation to FIG. 10, 11, or 12. Further, secondary compensated luminance of the adjacent light sources may be determined by "distributing" the first compensated luminance of the hypothetically-defined light sources to the adjacent light sources as described in relation to FIGS. 16A and 16B. The secondary compensated luminance of the adjacent light sources may be used to control light emissions of the adjacent light sources.

Figure 17:
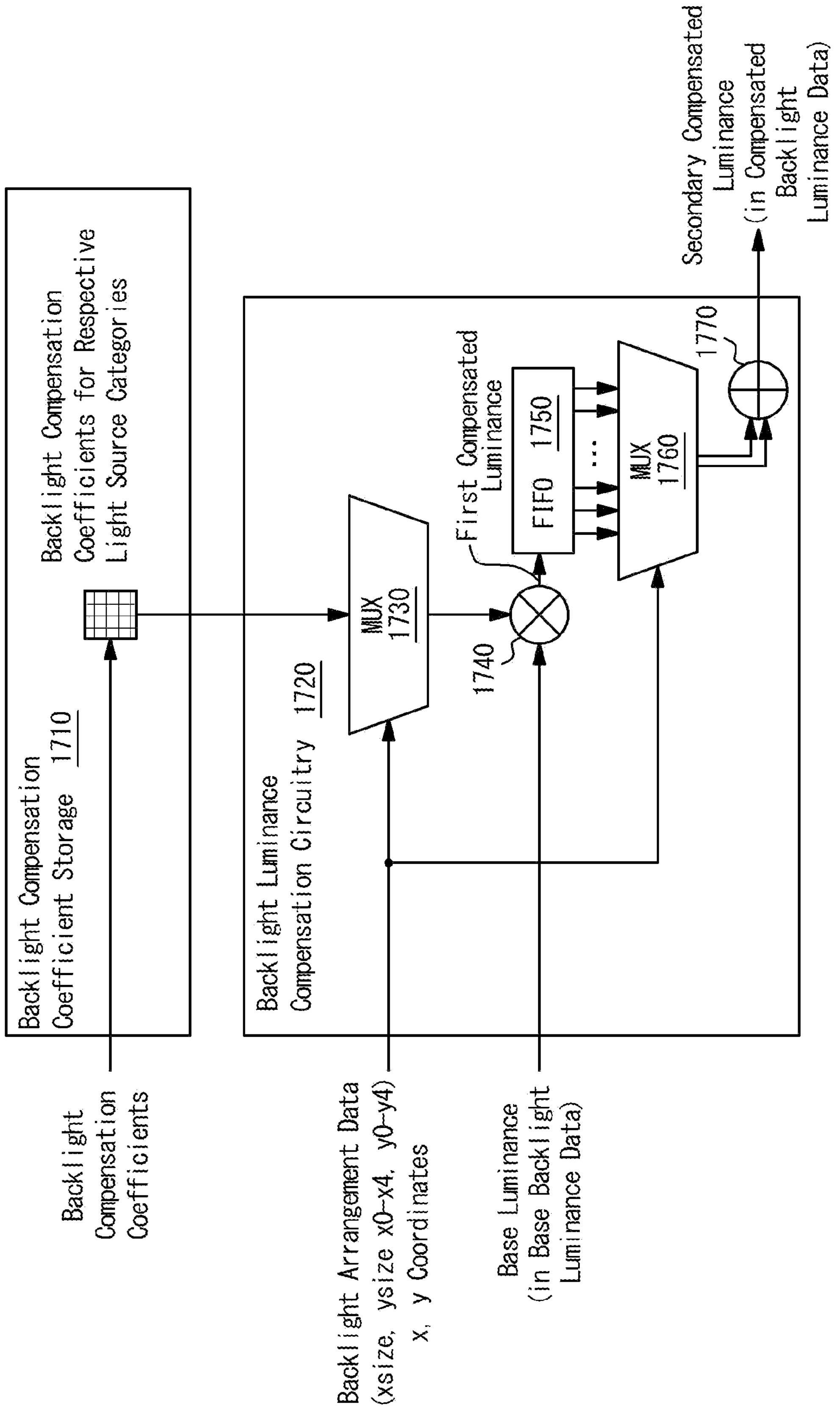
FIG. 17 shows example configurations of a backlight compensation coefficient storage and backlight luminance compensation circuitry, according to one or more embodiments.

FIG. 17 shows example configurations of a backlight compensation coefficient storage 1710 and backlight luminance compensation circuitry 1720, according to one or more embodiments. The backlight compensation coefficient storage 1710 and the backlight luminance compensation circuitry 1720 are adapted to compensate the decrease in the brightness at the edge of the rounded corner of the display panel 1600 shown in FIG. 16B. The backlight compensation coefficient storage 1710 may be one embodiment of the backlight compensation coefficient storage 720 shown in FIG. 9, and the backlight luminance compensation circuitry 1720 may be one embodiment of the backlight luminance compensation circuitry 730 shown in FIG. 9.

The backlight compensation coefficient storage 1710 is configured to store backlight compensation coefficients for respective "light source categories" similarly to the backlight compensation coefficient storage 1210 shown in FIG. 12. In one implementation, a light source category "Hypothetical" may be further defined for the hypothetically-defined light sources 1620, and the backlight compensation coefficient storage 1710 may be further configured to store a backlight compensation coefficient for the light source category "Hypothetical."

The backlight luminance compensation circuitry 1720 includes a multiplexer 1730, modifier circuitry 1740, a first-in-first out (FIFO) storage 1750, a multiplexer 1760, and modifier circuitry 1770. The multiplexer 1730 and the modifier circuitry 1740 are configured to operate similarly to the multiplexer 1230 and the modifier circuitry 1240 shown in FIG. 12 to determine first compensated luminance of the light sources 1610 and the hypothetically-defined light sources 1620. The multiplexer 1730 is configured to identify, based on the backlight arrangement data and the position of each light source of interest (which may be a light source 1610 or a hypothetically-defined light source 1620), the light source category to which each light source of interest belongs. Based on the backlight arrangement data and the position of each light source of interest, the multiplexer 1730 is configured to identify the light source category to which each light source of interest belongs. The multiplexer 1730 is further configured to select the backlight compensation coefficient corresponding to the identified light source category for each light source of interest from among the backlight compensation coefficients stored in the backlight compensation coefficient storage 1710. The modifier circuitry 1740 is configured to apply the selected backlight compensation coefficient to the base luminance for each light source of interest to determine first compensated luminance for each light source of interest. The FIFO storage 1750 is configured to store the first compensated luminance for each light source 1610 and each hypothetically-defined light source 1620.

The multiplexer 1760 and modifier circuitry 1770 are configured to determine secondary compensated luminance for each light source 1610 by "distributing" of the first compensated luminance of the hypothetically-defined light sources 1620 to adjacent light sources 1610 as described in relation to FIG. 16B. The multiplexer 1760 is configured to retrieve the first compensated luminance of the light source 1610 of interest and the first compensated luminance of the relevant hypothetically-defined light source(s) 1620 from the FIFO storage 1750. The modifier circuitry 1770 is configured to determine the secondary compensated luminance of the light source 1610 of interest by modifying the first compensated luminance of the light source 1610 of interest based on the first compensated luminance of the relevant hypothetically-defined light source(s) 1620. For example, the secondary compensated luminance of the light sources 1610*a*, 1610*b*, 1610*c*, 1610*d*, and 1610*e* shown in FIG. 16B may be determined in accordance with expressions (1a), (1b), (1c), (1d), and (1e), respectively. The light emissions of the light sources 1610 may be controlled based on the secondary compensated luminance of the light source 1610 thus determined.

Figure 18:
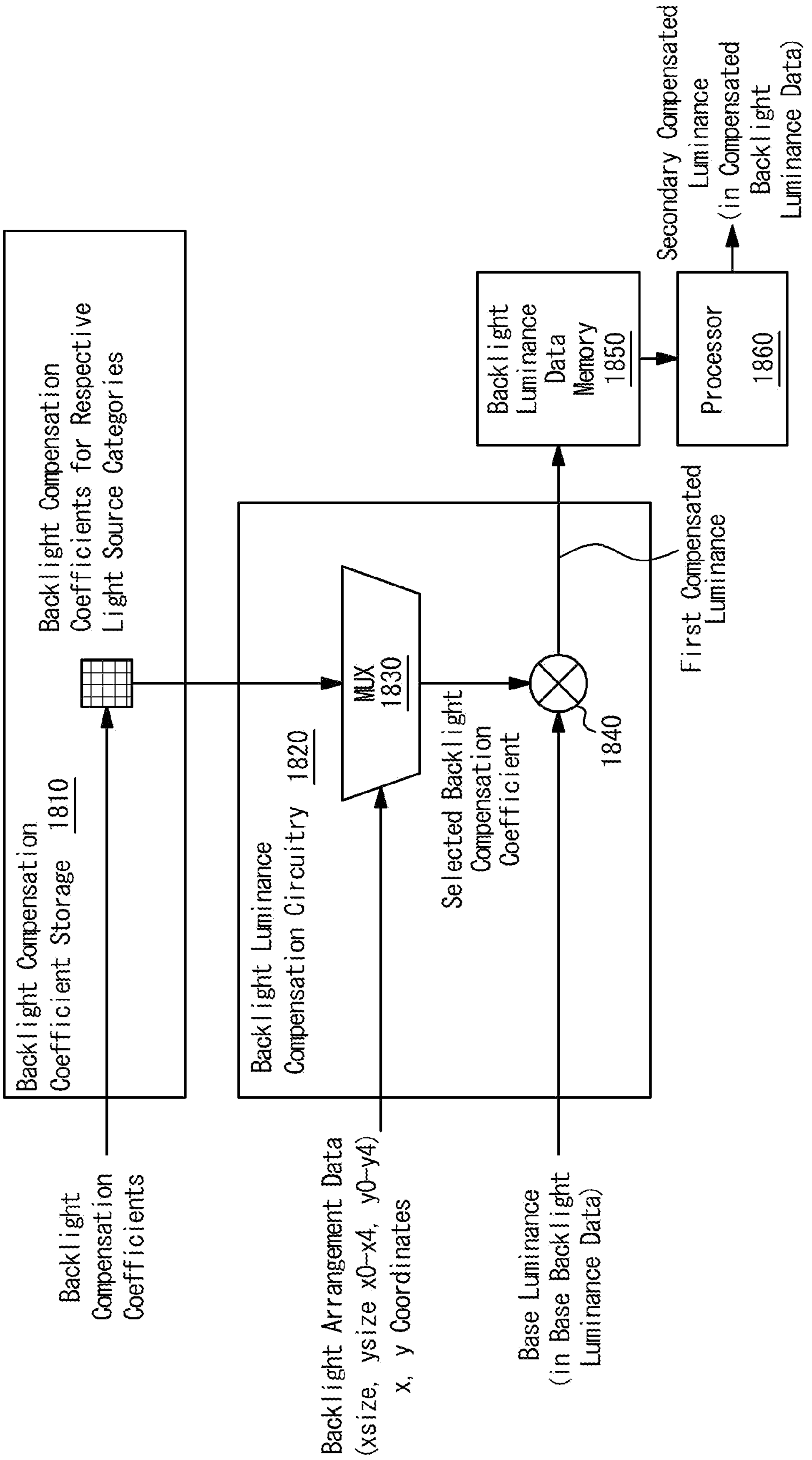
FIG. 18 shows example configurations of a backlight compensation coefficient storage and backlight luminance compensation circuitry, according to one or more embodiments.

FIG. 18 shows example configurations of a backlight compensation coefficient storage 1810 and backlight luminance compensation circuitry 1820, according to one or more embodiments. The backlight compensation coefficient storage 1810 and the backlight luminance compensation circuitry 1820 are also adapted to compensate the decrease in the brightness at the edge of the rounded corner of the display panel 1600 shown in FIG. 16B. The backlight compensation coefficient storage 1810 may be one embodiment of the backlight compensation coefficient storage 720 shown in FIG. 9, and the backlight luminance compensation circuitry 1820 may be one embodiment of the backlight luminance compensation circuitry 730 shown in FIG. 9.

The backlight compensation coefficient storage 1810 is configured to store backlight compensation coefficients for respective "light source categories" similarly to the backlight compensation coefficient storages 1210 shown in FIG. 12. In one implementation, a light source category "Hypothetical" may be further defined for the hypothetically-defined light sources 1620, and the backlight compensation coefficient storage 1810 may be further configured to store a backlight compensation coefficient for the light source category "Hypothetical."

The backlight luminance compensation circuitry 1820 includes a multiplexer 1830 and modifier circuitry 1840. The multiplexer 1830 and the modifier circuitry 1840 are configured to operate similarly to the multiplexer 1730 and the modifier circuitry 1740 shown in FIG. 17 to determine the first compensated luminance of the light sources 1610 and the hypothetically-defined light sources 1620. The multiplexer 1830 is configured to identify, based on the backlight arrangement data and the position of each light source of interest (which may be a light source 1610 or a hypothetically-defined light source 1620), the light source category to which each light source of interest belongs. Based on the backlight arrangement data and the position of each light source of interest, the multiplexer 1830 is configured to identify the light source category to which each light source of interest belongs. The multiplexer 1830 is further configured to select the backlight compensation coefficient corresponding to the identified light source category for each light source of interest from among the backlight compensation coefficients stored in the backlight compensation coefficient storage 1810. The modifier circuitry 1840 is configured to apply the selected backlight compensation coefficient to the base luminance for each light source of interest to determine first compensated luminance for each light source of interest.

In the embodiment shown in FIG. 18, a backlight luminance data memory 1850 and a processor 1860 are used to determine the secondary compensated luminance for each light source 1610 by "distributing" of the first compensated luminance of the hypothetically-defined light sources **1620*a* and 1620*b* to adjacent light sources 1610 as described in relation to FIG. 16B. The backlight luminance data memory 1850 is configured to store the first compensated luminance for each light source and each hypothetic light source. The processor 1860 is configured to retrieve the first compensated luminance of the light source 1610 of interest and the first compensated luminance of the relevant hypothetically-defined light source(s) 1620 from the backlight luminance data memory 1850. The processor 1860 is further configured to determine the secondary compensated luminance of the light source 1610 of interest by modifying the first compensated luminance of the light source 1610 of interest based on the first compensated luminance of the relevant hypothetically-defined light source(s) 1620. For example, the secondary compensated luminance of the light sources 1610*a*, 1610*b*, 1610*c*, 1610*d*, and 1610*e* shown in FIG. 16B may be determined in accordance with expressions (1a), (1b), (1c), (1d), and (1e), respectively. The light emissions of the light sources 1610 may be controlled based on the secondary compensated luminance of the light source 1610** thus determined.

Figure 19:
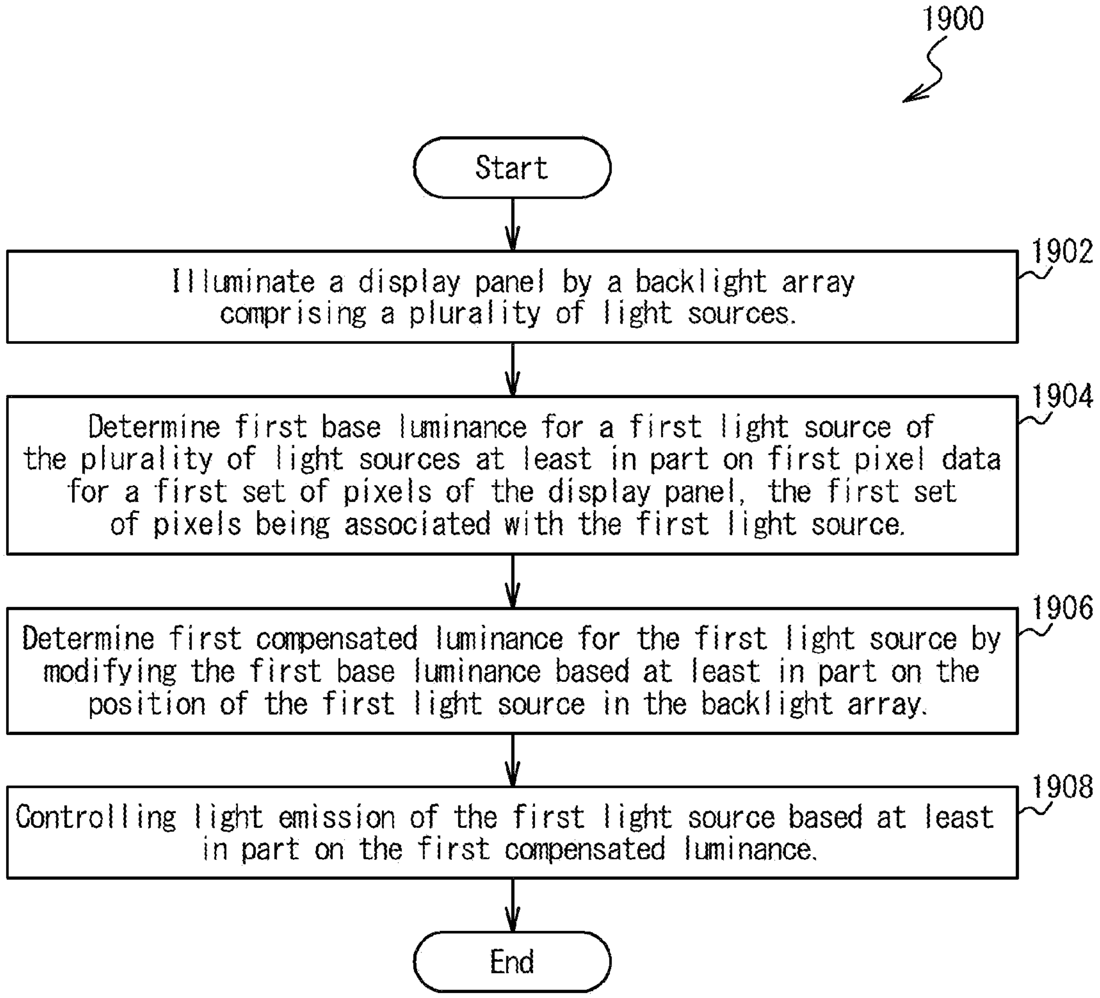
FIG. 19 shows a flowchart depicting an example method for controlling light sources of a backlight module, according to one or more embodiments.

FIG. 19 shows a flowchart depicting an example method 1900 for controlling light sources of a backlight module, according to one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 19.

The method 1900 includes illuminating a display panel (e.g., the display panel 100 shown in FIG. 1, the display panel 200 shown in FIG. 2, and the display panel 1600 shown in FIGS. 16A and 16B) by a backlight array (e.g., the backlight array 410 shown in FIG. 4) at step 1902. The backlight array includes a plurality of light sources (e.g., the light sources 420 shown in FIG. 4 and the light sources 1610 shown in FIGS. 16A and 16B). The method 1900 further includes determining first base luminance for a first light source of the plurality of light sources based at least in part on first pixel data for a first set of pixels of the display panel at step 1904. The first set of pixels are associated with the first light source. The method 1900 further includes determining first compensated luminance for the first light source by modifying the first base luminance based at least in part on a position of the first light source in the backlight array at step 1906. The method 1900 further includes controlling light emission of the first light source based at least in part on the first compensated luminance at step 1908.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display device, comprising:
- a display panel;
- a backlight array configured to illuminate the display panel, the backlight array comprising a plurality of light sources; and
- backlight control circuitry configured to:
  - determine first base luminance for a first light source of the plurality of light sources based at least in part on pixel data for a first set of pixels associated with the first light source,
  - determine first compensated luminance for the first light source by modifying the first base luminance based at least in part on a position of the first light source in the backlight array, the position being a distance from an outermost light source of the backlight array that is nearest to the first light source, and
  - control light emission of the first light source based at least in part on the first compensated luminance.

2. The display device of claim 1, wherein modifying the first base luminance of the first light source is based at least in part on an arrangement of other light sources of the plurality of light sources around the first light source.

3. The display device of claim 1, wherein the first light source is an outermost light source of the backlight array, and
- wherein the first compensated luminance is higher than the first base luminance.

4. The display device of claim 3, wherein the backlight control circuitry is further configured to:
- determine second base luminance for a second light source of the plurality of light sources based at least in part on pixel data for a second set of pixels associated with the second light source, the second light source being a second-outermost light source of the backlight array,
- determine second compensated luminance for the second light source, the second compensated luminance being lower than the second base luminance, and
- control light emission of the second light source based on the second compensated luminance.

5. The display device of claim 1, wherein the backlight control circuitry is further configured to:
- store a plurality of compensation coefficients,
- select a first compensation coefficient for the first light source from among the stored plurality of compensation coefficients based at least in part on the position of the first light source in the backlight array, and wherein determining the first compensated luminance comprises modifying the first base luminance based on the first compensation coefficient.

6. The display device of claim 5, wherein selecting the first compensation coefficient is further based on backlight arrangement data indicative of an arrangement of the plurality of light sources of the backlight array.

7. The display device of claim 5, wherein a number of the stored plurality of compensation coefficients are less than a number of the plurality of light sources.

8. The display device of claim 5, wherein the plurality of compensation coefficients are respectively associated with light source categories defined based at least in part on an arrangement of the plurality of light sources in the backlight array, and wherein selecting the first compensation coefficient for the first light source is based at least in part on which one of the light source categories the first light source is classified to.

9. The display device of claim 5, wherein the backlight control circuitry is further configured to modify the first compensation coefficient based on a sensor-based compensation coefficient generated based on a sensor output.

10. The display device of claim 9, wherein the sensor output corresponds to at least one of sensed external light intensity and sensed temperature.

11. The display device of claim 1, wherein the backlight control circuitry is further configured to determine luminance for an omitted light source associated with a third set of pixels based at least in part on pixel data for the third set of pixels, wherein determining the first compensated luminance by modifying the first base luminance is further based on the luminance for the omitted light source.

12. A display device, comprising:

a display panel;

a backlight array configured to illuminate the display panel, the backlight array comprising a plurality of light sources; and backlight control circuitry configured to:

determine first luminance for a first light source of the plurality of light sources based at least in part on first pixel data for a first set of pixels of the display panel, determine second luminance for an omitted light source based at least in part on second pixel data for a second set of pixels of the display panel, determine compensated luminance for the first light source based at least in part on the first luminance and the second luminance, and control light emission of the first light source based at least in part on the compensated luminance.

13. The display device of claim 12, wherein the first light source is positioned in a rounded corner of the display panel.

14. The display device of claim 12, wherein the display panel is sectioned into a plurality of display sections, respectively, wherein the first set of pixels are positioned in a first display section of the plurality of display sections, the first display section being opposed to the first light source, and wherein the second set of pixels are positioned in a second display section that is located at an edge of the display panel and opposed to none of the plurality of light sources.

15. The display device of claim 12, wherein the backlight control circuitry is further configured to determine first base luminance for the first light source based at least in part on the first pixel data for the first set of pixels, wherein determining the first luminance for the first light source comprises determining first luminance by modifying the first base luminance based at least in part on a position of the first light source in the backlight array.

16. The display device of claim 12, wherein the backlight control circuitry is further configured to calculate a first average picture level (APL) for the first set of pixels based on the first pixel data for the first set of pixels, wherein determining the first luminance for the first light source is based on the first APL.

17. The display device of claim 12, wherein the backlight control circuitry is further configured to calculate a second APL for the second set of pixels based on the second pixel data for the second set of pixels, wherein determining the second luminance for the omitted light source is based on the second APL.

18. A method, comprising:

illuminating a display panel by a backlight array comprising a plurality of light sources;

determining first base luminance for a first light source of the plurality of light sources based at least in part on first pixel data for a first set of pixels of the display panel, the first set of pixels being associated with the first light source;

determining first compensated luminance for the first light source by modifying the first base luminance based at least in part on a position of the first light source in the backlight array, the position being a distance from an outermost light source of the backlight array that is nearest to the first light source; and controlling light emission of the first light source based at least in part on the first compensated luminance.

19. The method of claim 18, wherein modifying the first base luminance of the first light source is based at least in part on an arrangement of other light sources of the plurality of light sources around the first light source.

* * * * *